US010250491B2

(12) United States Patent
Lee et al.

(10) Patent No.: US 10,250,491 B2
(45) Date of Patent: Apr. 2, 2019

(54) IN-FLOW PACKET PRIORITIZATION AND DATA-DEPENDENT FLEXIBLE QOS POLICY

(71) Applicant: QUALCOMM Incorporated, San Diego, CA (US)

(72) Inventors: Soo Bum Lee, San Diego, CA (US); Stefano Faccin, San Ysidro, CA (US); Haris Zisimopoulos, London (GB)

(73) Assignee: QUALCOMM Incorporated, San Diego, CA (US)

(*) Notice: Subject to any disclaimer, the term of this patent is extended or adjusted under 35 U.S.C. 154(b) by 10 days.

(21) Appl. No.: 15/348,894

(22) Filed: Nov. 10, 2016

(65) Prior Publication Data
US 2017/0324652 A1 Nov. 9, 2017

Related U.S. Application Data

(60) Provisional application No. 62/333,788, filed on May 9, 2016.

(51) Int. Cl.
H04L 12/721 (2013.01)
H04L 12/26 (2006.01)
(Continued)

(52) U.S. Cl.
CPC ............. *H04L 45/26* (2013.01); *H04L 43/16* (2013.01); *H04L 47/2458* (2013.01);
(Continued)

(58) Field of Classification Search
CPC ... H04W 88/16; H04W 84/04; H04W 72/085; H04W 12/08; H04W 72/08
See application file for complete search history.

(56) References Cited

U.S. PATENT DOCUMENTS

2002/0114274 A1  8/2002  Sturges et al.
2006/0146703 A1  7/2006  Cha et al.
(Continued)

FOREIGN PATENT DOCUMENTS

WO  WO-2015042389 A1  3/2015
WO  WO-2015131305 A1  9/2015

OTHER PUBLICATIONS

Sanneck H., et al., "Selective Packet Prioritization for Wireless Voice over IP," Sep. 2001, 9 pages.
(Continued)

*Primary Examiner* — Chi Ho A Lee
(74) *Attorney, Agent, or Firm* — Loza & Loza, LLP/Qualcomm Incorporated

(57) ABSTRACT

A method, operational at a device, includes receiving at least one packet belonging to a first set of packets of a packet flow marked with an identification value, determining that the at least one packet is marked with the identification value, determining to change a quality of service (QoS) treatment of packets belonging to the first set of packets marked with the identification value that are yet to be received, and sending a request to change the QoS treatment of packets belonging to the first set of packets marked with the identification value that are yet to be received to trigger a different QoS treatment of packets within the packet flow, responsive to determining to change the QoS treatment. Other aspects, embodiments, and features are also claimed and described.

54 Claims, 22 Drawing Sheets

(51) Int. Cl.
*H04L 29/06* (2006.01)
*H04W 12/08* (2009.01)
*H04W 72/08* (2009.01)
*H04L 12/833* (2013.01)
*H04L 29/08* (2006.01)
*H04W 28/02* (2009.01)
*H04W 84/04* (2009.01)
*H04W 88/16* (2009.01)
*H04W 28/16* (2009.01)

(52) U.S. Cl.
CPC ............ *H04L 63/102* (2013.01); *H04L 65/00* (2013.01); *H04L 67/322* (2013.01); *H04L 69/22* (2013.01); *H04W 12/08* (2013.01); *H04W 28/02* (2013.01); *H04W 72/085* (2013.01); *H04W 28/16* (2013.01); *H04W 84/042* (2013.01); *H04W 88/16* (2013.01)

(56) References Cited

U.S. PATENT DOCUMENTS

| | | |
|---|---|---|
| 2007/0025264 A1 | 2/2007 | Cheng et al. |
| 2007/0147237 A1 | 6/2007 | Haddad et al. |
| 2008/0020775 A1 | 1/2008 | Willars |
| 2010/0332610 A1* | 12/2010 | Cherian ................ H04W 72/10 709/207 |
| 2012/0039337 A1 | 2/2012 | Jackowski et al. |
| 2013/0058214 A1* | 3/2013 | Foglar ................ H04L 41/5022 370/230.1 |
| 2013/0064104 A1* | 3/2013 | Bekiares ............ H04L 63/1466 370/252 |
| 2013/0159479 A1* | 6/2013 | Vasseur .................. H04L 47/10 709/221 |
| 2013/0322255 A1* | 12/2013 | Dillon .................... H04L 47/22 370/236 |
| 2014/0355463 A1* | 12/2014 | Smith .................. H04M 15/60 370/252 |
| 2015/0043531 A1* | 2/2015 | Masini .................. H04L 47/805 370/331 |
| 2015/0250001 A1 | 9/2015 | Tan et al. |
| 2015/0257024 A1 | 9/2015 | Baid et al. |
| 2015/0289169 A1* | 10/2015 | Capdevielle .......... H04W 24/02 455/436 |
| 2016/0050682 A1 | 2/2016 | Uchino et al. |
| 2016/0234124 A1* | 8/2016 | Tomici ................. H04W 28/24 |
| 2016/0262044 A1* | 9/2016 | Calin ................ H04W 28/0268 |
| 2017/0041828 A1 | 2/2017 | Zhang et al. |
| 2017/0104758 A1* | 4/2017 | Jin ........................ H04W 12/06 |
| 2017/0317937 A1* | 11/2017 | Dillon .................... H04L 43/10 |

OTHER PUBLICATIONS

International Search Report and Written Opinion—PCT/US2017/023895—ISA/EPO—dated Jul. 27, 2017.
Response to Written Opinion dated Jul. 27, 2017 from International Application No. PCT/US2017/023895, filed Oct. 27, 2017, 9 pages.
Second Written Opinion from International Application No. PCT/US2017/023895, dated Apr. 17, 2018, 7 pages.

* cited by examiner

IN-FLOW PACKET PRIORITIZATION AND DATA-DEPENDENT FLEXIBLE QOS POLICY

PRIORITY CLAIM

This application claims priority to and the benefit of Provisional Application No. 62/333,788 filed in the United States Patent Office on May 9, 2016 the entire contents of which is incorporated by reference herein as if fully set forth below in its entirety for all applicable purposes.

TECHNICAL FIELD

Aspects described herein relate generally to use of packet identification markings, and more specifically to use of one or more identification values (where an identification value may be a packet-set marking and/or a token) for in-flow packet prioritization and data-dependent flexible QoS policy.

INTRODUCTION

In a digital communication network such as a cellular communication network, packets may be exchanged between a device (e.g., a chip component, a client device, a mobile device, a user equipment, a user device, a terminal), a radio access network (RAN), a core network, and an application server (e.g., a non-core network entity). The application server may be part of, for example, a packet data network (PDN) (e.g., the Internet) and/or an Internet Protocol (IP) Multimedia Service (IMS) network.

Data is divided into packets and packets are streamed between the just mentioned entities. A packet stream may have multiple packets that all share the same scheduling priority. For many applications this has been found to be a sufficient method of operation. However, for some applications, the assignment of one scheduling priority to all packets in the entire packet stream may become problematic. For example, there is a set of mechanisms for video streaming that organize the video stream, not as a continuous stream of packets but as multiple blocks, or sets, of packets, where each set of packets has a time deadline. That is, each set of packets must be received by a user device by a certain time. For example, each set of packets may cover five seconds of a video, and either the user device obtains all packets in the set of packets within the five seconds or all packets in the set must be discarded because otherwise the video will stall or be garbled due to receipt of packets out of order.

It may therefore be desirable to provide for prioritization of a set of one or more packets in a given packet flow, to dynamically alter the scheduling behavior of a packet stream in order to ensure that the user device will be able to obtain all packets in a set of packets by a deadline, and/or for situations where, for example, the QoS of packets in the given packet flow is not the same.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

According to one example, a method may be operational at a device. The method may include receiving at least one packet belonging to a first set of packets of a packet flow marked with an identification value, determining that the at least one packet is marked with the identification value, determining to change a quality of service (QoS) treatment of packets belonging to the first set of packets marked with the identification value that are yet to be received, and sending a request to change the QoS treatment of packets belonging to the first set of packets marked with the identification value that are yet to be received to trigger a different QoS treatment of packets within the packet flow, responsive to determining to change the QoS treatment. The identification value may be a marking that enables at least one of a user-plane gateway or a radio access network entity to differentiate the first set of packets from a second set of packets in the packet flow. The identification value may be at least one of a token or a packet-set marking. The identification value may be a marking that is different and separate from a token used to identify a type of packet in the first set of packets. The identification value may be a marking that is different and separate from a marking used to identify a QoS treatment of a packet in the first set of packets. The identification value may be added to the packets by an application server that sends the packets. In some aspects, the identification value may be based on a pre-negotiation (e.g., a negotiation that takes place before a first set of packets is transferred) with a source of the packets in the packet flow that marked the first set of packets with the identification value.

According to one example, a device may include a network communication interface circuit adapted to communicate with a communication network, and a processing circuit coupled to the network communication interface circuit, the processing circuit may be configured to receive at least one packet belonging to a first set of packets of a packet flow marked with an identification value, determine that the at least one packet is marked with the identification value, determine to change a quality of service (QoS) treatment of packets belonging to the first set of packets marked with the identification value that are yet to be received, and send a request to change the QoS treatment of packets belonging to the first set of packets marked with the identification value that are yet to be received to trigger a different QoS treatment of packets within the packet flow, responsive to determining to change the QoS treatment. The identification value may be a marking that enables at least one of a user-plane gateway or a radio access network entity to differentiate the first set of packets from a second set of packets in the packet flow. The identification value may be at least one of a token or a packet-set marking. The identification value may be a marking that is different and separate from a token used to identify a type of packet in the first set of packets. The identification value may be a marking that is different and separate from a marking used to identify a QoS treatment of a packet in the first set of packets. The identification value may be added to the packets by an application server that sends the packets. The identification value may be based on a pre-negotiation (e.g., a negotiation that takes place before a first set of packets is transferred) with a source of the packets in the packet flow that marked the first set of packets with the identification value.

According to one example, another method may be operational at a network entity that determines a quality of service (QoS) treatment of packets in a packet flow. The method may include receiving a request to change a QoS treatment of packets in the packet flow that are marked with an identification value, from a user device, wherein the request contains the identification value and an indication of how to change the QoS treatment and, when granted, triggers a different QoS treatment of packets in a first set of packets of the packet flow marked with the received identification value. The method may further include verifying that the user device is authorized to send the request to change the QoS treatment of packets in the packet flow, wherein a changed QoS treatment overrides an original QoS treatment established for the first set of packets marked with the identification value, responsive to receiving the request, and changing the QoS treatment for the first set of packets in the packet flow marked with the identification value according to the request, if verifying is successful. The network entity that determines the QoS treatment of packets may be at least one of a user-plane gateway or a radio access network. According to some aspects, the identification value may be a marking that enables the network entity that determines the QoS treatment of packets to differentiate the first set of packets from a second set of packets in a packet flow to the user device. In some examples, the identification value may be at least one of a token or a packet-set marking. In some aspects, the identification value may be a marking that is different and separate from a token used to identify a type of packet in the first set of packets. In some examples, the identification value may be a marking that is different and separate from a marking used to identify a QoS treatment of a packet in the first set of packets. The identification value may be added to the packets by an application server that sends the packets.

In one example, a network device that determines a quality of service (QoS) treatment of packets in a packet flow is disclosed. The network device may include a network communication interface circuit adapted to communicate with a communication network, and a processing circuit coupled to the network communication interface circuit, the processing circuit configured to: receive a request to change a QoS treatment of packets in the packet flow that are marked with an identification value, from a user device, wherein the request, when granted, triggers a different QoS treatment of packets in a first set of packets of the packet flow marked with the identification value, verify that the user device is authorized to send the request to change the QoS treatment of packets in the packet flow, wherein a changed QoS treatment overrides an original QoS treatment established for the first set of packets marked with the identification value, responsive to receiving the request, and change the QoS treatment for the first set of packets in the packet flow marked with the identification value according to the request, if verifying is successful. According to some aspects, the network device that determines the QoS treatment of packets may be at least one of a user-plane gateway device or a radio access network device. The identification value may be a marking that enables the network device that determines the QoS treatment of packets to differentiate the first set of packets from a second set of packets in a packet flow to the user device. The identification value may be at least one of a token or a packet-set marking. The identification value may be a marking that is different and separate from a token used to identify a type of packet in the first set of packets. The identification value may be a marking that is different and separate from a marking used to identify a QoS treatment of a packet in the first set of packets. The identification value may be added to the packets by an application server that sends the packets.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
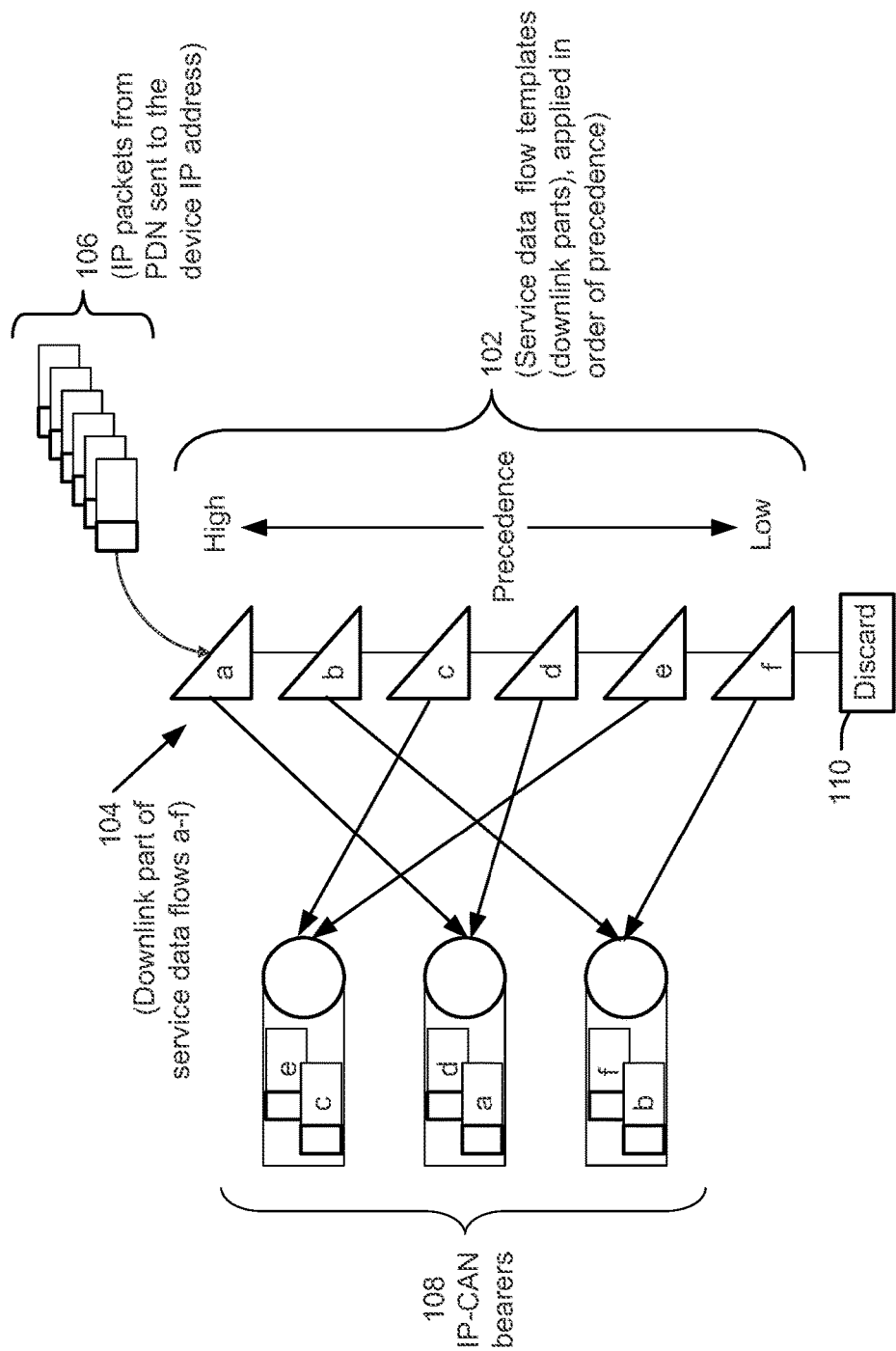
FIG. 1 illustrates a role of a service data flow (SDF) template in detecting a downlink part of service data flows and mapping that downlink part to packet flows or bearers according to the prior art.

In the following description, reference is made to the accompanying drawings in which is shown, by way of illustration, specific aspects and features described in the disclosure. The aspects and features described in the disclosure are intended to be provided in sufficient detail to enable those skilled in the art to practice the invention. Other aspects and features may be utilized and changes may be made to that which is disclosed without departing from the scope of the disclosure. The following detailed description is not to be taken in a limiting sense, and the scope of the aspects, features, and implementations described and illustrated herein are defined only by the appended claims.

The term "exemplary" is used herein to mean "serving as an example, instance, or illustration." Any aspect, feature, or implementation described herein as "exemplary" is not necessarily to be construed as preferred or advantageous over other aspects, features, or implementations. The term "aspect" does not require that all aspects include the discussed aspect, or any discussed feature, advantage, and/or mode of operation. The term "obtain" is used herein to mean derive, generate, compute, request, receive, acquire, accept, procure, take, collect, get, take delivery or receipt of, be given, gain access to, come into possession of, etc. The term "obtain" as used herein encompasses obtaining locally, and/or obtaining from a non-local or remote entity (e.g., device, server, policy and charging rules function (PCRF), application function (AF), node). The term "obtain" as used herein encompasses obtaining partially and/or obtaining completely. The term "device" is used herein to refer to a chip component, client device, wireless device, mobile device, mobile phone, mobile communication device, mobile computing device, digital tablet, smart phone, user equipment, user device, user terminal, access terminal, and/or terminal, among other devices. The term "send" is used herein to mean provision, transmit, forward, provide, supply, to cause to be conveyed to a destination, and the like.

As used herein, a "traffic filtering token" may be a token obtained using a cryptographic process or another process, such as a non-cryptographic process. Likewise, verification of the traffic filtering token may be through use of a cryptographic verification process or a non-cryptographic verification process, as appropriate to the token. A traffic filtering token may be used for traffic filtering and policy enforcement.

As used herein, an "application function" may be a control-plane entity (e.g., an entity having functionality in the control-plane). The application function may be a part of (e.g., included with, associated with, coupled to) an application server.

As used herein, the "application server" may be a user-plane entity (e.g., an entity having functionality in the user-plane). For example, the application server may be a user-plane entity that creates (e.g., constructs, compiles, forms, assembles) a packet and sends the packet to a device in downlink user-plane traffic. The application server may host one or more applications and/or application services (individually and collectively referred to herein as "application services"). Exemplary application services include one or more types of traffic, for example, streaming video, voice, and data services. A device may subscribe to an application service. As used herein, an "application service" may be any service (e.g., an IP application) provided by an application service provider.

As used herein, the terms "set of" and "block of" are equivalent in meaning. The terms "set of" and "block of" as used herein may mean, for example, a collection of, a group of, an arrangement of, an array of, a series of, and the like. For conciseness, the term "set of" is used throughout this disclosure in connection with, for example, the phrase "a set of packets." As used herein, elements of a set need not be continuous and need not be contiguous.

As used herein, the term "packet flow" may mean a set of packets exchanged between the device and the server in either direction and associated with one or more applications. A packet flow may be, for example, a packet stream, an IP flow (a flow of IP packets), an IP flow of packets with the same QoS requirements, an Ethernet PDU (packet data unit) flow, or an unstructured data flow. A packet flow may, for example, be referred to as a data flow, an IP flow, an IP data flow, and Ethernet data flow, a QoS data flow, a QoS flow, or an IP packet flow.

As used herein, an "identification value" may be a marking that enables at least one of a user-plane gateway or a radio access network entity to differentiate a first set of packets from a second set of packets in a packet flow. The identification value may be at least one of a packet-set marking and/or a token. In some aspects, the identification value may be a marking that is different and separate from a token used to identify a type of packet in a first set of packets. In some aspects, the identification value may be a marking that is different and separate from a marking used to identify a QoS treatment of a packet in the first set of packets. In some aspects, the identification value may be added to the packets by an application server that sends the packets. In some aspects, the identification value may be based on a pre-negotiation (e.g., a negotiation that takes place before a first set of packets is transferred) with a source of packets in a packet flow, where the source (e.g., an application server that sends the packets) marks the first set of packets with the identification value.

Networks external to a core network of a cellular communication network, such as a packet data network (PDN) (e.g., the Internet) and an IP Multimedia Service (IMS) network may be exemplified herein by reference to the PDN, however, nothing is intended to limit networks external to the core network to PDNs or IMS networks.

Furthermore, aspects and features presented herein are exemplary. Nothing is intended to limit any aspect or feature presented herein to use in only a cellular communication network.

General Overview

Aspects described herein may provide for prioritization of each packet in a given packet flow using differentiated tokens and/or packet-set markings. In other words, each packet in a given packet flow would obtain a token and/or packet-set marking for a purpose of traffic filtering and/or prioritization. The obtained token may be referred to herein as a "traffic filtering token." The obtained token or the obtained packet-set marking may be referred to herein as an "identification value."

In implementations described herein, an application function (AF) could embed, or otherwise include, a certain identification value (e.g., a packet-set marking) with packets in a set of packets in a given packet flow. Upon receipt of at least one packet of the set of packets marked with the identification value, a device (e.g., a UE) could determine to send a request to change a QoS treatment of the remainder of the packets in the set of packets. The device may send the request to a network entity that determines a quality of service (QoS) treatment of packets in a packet flow (e.g., a RAN, UP-GW, or P-GW). The request may include (or may be) a request to change a QoS treatment of packets in the packet flow that are marked with the identification value. The request may include the packets identification value and the different QoS treatment requested. The request, when granted, triggers a different QoS treatment of packets in a first set of packets of the packet flow marked with the identification value. Thereby in-flow packet prioritization and a data-dependent flexible QoS policy may be achieved. The packet flow may be a downlink packet flow.

In implementations described herein, a core network entity (e.g., a control-plane entity such as a mobility management entity (MME), a mobility management function (MMF) or an Access and Mobility Management Function (AMF) that manages a device authentication and reachability to the network, a session management function (SMF) that manages a device connectivity to the network, and/or a policy and charging rules function (PCRF) entity could issue multiple classes of traffic filtering tokens for a given packet flow based on a request from an application function (AF) of an application server. The application server may be a core or non-core network entity. Each class of the multiple classes may be associated with a specific priority, which may be distinct from a priority associated with another class. The traffic filtering tokens may be based, for example, on device subscription information (e.g., a subscription profile), one or more network policies (e.g., core network policies), a request by an AF of an application server (e.g., a non-core network server and associated AF representative of a non-core network entity), and/or a service agreement with a non-core network entity (e.g., a service-level agreement (SLA) between an application service provider and a network operator), or any one or combination thereof. An example of a non-core network entity is an application server, for example operated by a third party.

For downlink packet flow purposes, the core network entity could provision (e.g., send) the traffic filtering tokens to the AF of an application server. In one aspect, the AF can make a per-packet determination as to which class of token should be selected for a given packet based on, for example, the priority of the given packet within the given packet flow. The AF can then embed, or otherwise include, a selected traffic filtering token in or with the given packet. The AF may also embed, or otherwise include, a packet-set marking (e.g., an identification value) in or with the given packet. Upon obtaining the given packet in a downlink packet flow, one or more network entities (e.g., a user-plane gateway (UP-GW) of a core network, a packet data network gateway (P-GW) of a core network) and/or a radio access network (RAN) entity may prioritize the given packet based on the traffic filtering tokens and/or the packet-set marking embedded in the packet. As used herein, a reference to a RAN, RAN entity, or a radio access network device may be a reference to a component of the RAN, such as an eNodeB, or a 5G gNB (where gNB refers to a 5G base station), or a 3GPP New Radio base station. The given packet may then be routed to its destination via a mechanism (e.g., a bearer, a packet flow) appropriate to the requirements of the given packet, independently of the requirements of other packets in the same packet flow.

Accordingly, aspects provided herein may enable a packet flow to have dynamic priority (e.g., dual priority at a minimum) without requiring QoS re-negotiation (i.e., QoS changes for the given packet flow would not require re-negotiation between the application server and the core network or between the device (e.g., UE) and the core network).

Other aspects provided herein may provide for a data-dependent flexible QoS policy (in contrast to a QoS policy that applies the same QoS to all packets in a given packet flow, without regard to the data included in the individual packets that comprise the packet flow).

Communication Network Overview

As mentioned at the outset, in a digital communication network such as a cellular communication network, packets may be exchanged between a device (e.g., a chip component, a client device, a mobile device, a user equipment, a terminal), a radio access network (RAN), a core network, and an application server (e.g., a non-core network entity). The application server may be part of, for example, a packet data network (PDN) (e.g., the Internet) and/or an Internet Protocol (IP) Multimedia Service (IMS) network.

The RAN may be a part of a cellular communication network (e.g., 4G, Long Term Evolution (LTE), LTE-Advanced (LTE-A), and future networks such as 5G). The cellular communication network (also referred to herein as the communication network) may include the RAN and a core network (CN) (e.g., an evolved packet core (EPC)). Packets exchanged between the device, the RAN, and the core network may be exchanged on a control-plane and on a user-plane. The packets may be exchanged in control-plane messages and user-plane messages. Control-plane messages may include control signals (e.g., control signaling, control-plane signaling). User-plane messages may include user data (e.g., user data traffic, data traffic).

Packets traveling in the uplink and downlink directions may be forwarded through bearers (e.g., IP Connectivity Access Network (IP-CAN) bearers), or more generally (e.g., in a cellular communication network where bearers may not be defined or may not be used) may be forwarded in packet flows. As known to those of skill in the art, the direction of data flowing toward a device may be referred to as the downlink direction, while the direction of data flowing from the device may be referred to as the uplink direction.

Under present paradigms, quality of service (QoS) may be enforced on a packet flow basis. Current QoS and policing solutions can assume that all packets in a given packet flow have the same QoS requirement. However, there may be situations to which the current paradigms do not apply. For example, in a packet flow of a video service, sequential packets in a given packet flow may have different priorities (and therefore different QoS requirements). For example, video frames may include anchor frames and non-anchor frames, where an anchor frame may have a higher priority than a non-anchor frame. Accordingly, it would be beneficial to treat the anchor frame with a QoS having a higher priority than the non-anchor frame. However, as explained, all packets in a given packet flow may be treated as having the same QoS requirement and it is therefore not possible to treat one packet differently from another packet in a given packet flow. Additionally, changing QoS for a given packet flow requires the use of resources. Under present paradigms, once the QoS for a given packet flow is established, changes to the QoS for the given packet flow need to be re-negotiated between an application server and the core network or between the device and the core network. The application server may be a core or non-core network entity. Accordingly, a need may exist to provide for methods and apparatus that may implement per-packet QoS treatment within a given packet flow, where each packet may have a different priority/importance.

Using the downlink direction for exemplary purposes, downlink Internet Protocol (IP) packets (hereinafter "downlink data packets") flow into a core network from, for example, a PDN (e.g., the Internet). The downlink data packets may enter the core network via a gateway device (e.g., a user-plane gateway (UP-GW), a packet data network gateway (P-GW) device). The gateway device may be an enforcement point for network policies (e.g., core network policies). The gateway device may enforce network policies (e.g., downlink policies) on the downlink data packets.

The handling of the downlink data packets at the P-GW may require the various downlink data packets to be mapped to various bearers or packet flows in the cellular communication network. The various bearers or packet flows may support, for example, various different maximum bit rates (MBR) and/or other parameters that may influence quality of service (QoS).

A present solution for mapping is realized using packet inspections (e.g., deep packet inspections and/or shallow packet inspections), traffic flow templates (TFT), and service data flow (SDF) templates. The present solution is referred to herein as the TFT/SDF approach. In the TFT/SDF approach, a P-GW confirms that the downlink data packets conform to a TFT/SDF template defined for the application service(s) by inspecting the headers of each downlink data packet.

The TFT/SDF approach entails the passage of downlink data packets through a set of packet filters in the SDF templates in order, for example, to map each downlink data packet to a bearer or packet flow.

FIG. 1 illustrates a role of a service data flow (SDF) template 102 in detecting a downlink part of service data flows (a-f) 104 (e.g., from a stream of downlink data packets 106) and mapping that downlink part to packet flows or bearers (such as IP-CAN bearers 108), according to the prior art. Any packet that does not correspond to an SDF template 102 may be delivered to a discard 110 location. FIG. 1 is based on Third Generation Partnership Project (3GPP) technical specification (TS) 23.203, FIG. 6.4.

The SDF template 102 is used in a procedure to validate and map each downlink data packet in the stream of downlink data packets 106. The SDF template 102 is used for filtering. Mapping may be done by a certain function that applies a data packet to a corresponding SDF filter. Then, the SDF filter enforces policies. However, use of the sets of packet filters in the SDF template 102 entails the use of tables and table lookup procedures. Use of such tables and procedures affects efficiency in that the tables take up memory/storage space and execution of the procedures expends processor resources. Additionally, time resources are wasted in that each packet in the stream of downlink data packets 106 must be filtered through one or more filters within each SDF template 102 before any given packet in the stream of downlink data packets 106 is applied to an SDF template 102 that meets all of the requirements of the one or more filters therein.

Using packet inspections (e.g., deep packet inspections and/or shallow packet inspections) and TFT/SDF templates at the P-GW, for example, for access and policy enforcement of downlink traffic, may incur overhead (e.g., processing and memory resources for memory lookup and pattern matching) and add forwarding latency due to processing delay. Additionally, fine-grain policy control (e.g., per application service) is difficult because additional policy control would incur additional overhead and processing delay. Furthermore, use of TFT/SDF templates is not scalable for sponsored connectivity. For example, an increase in the number of sponsors of different application services (perhaps thousands of new application services in years to come) would mean an increase in the time needed to filter packets through an increased number of templates. This, again, would incur additional overhead and processing delay.

Furthermore, enforcement of QoS on a per-packet basis is not practicable, because QoS is traditionally enforced on a packet flow basis. Current QoS and policing solutions can assume that all packets in a given packet flow have the same QoS requirement. Additionally, in accordance with tradition, after QoS for a packet flow is first established, changes to the QoS for the packet flow need to be re-negotiated between an application server and the core network or between the device and the core network.

Comparison of SDF/TFT Approach to an Exemplary Aspect Described Herein

Figure 2:
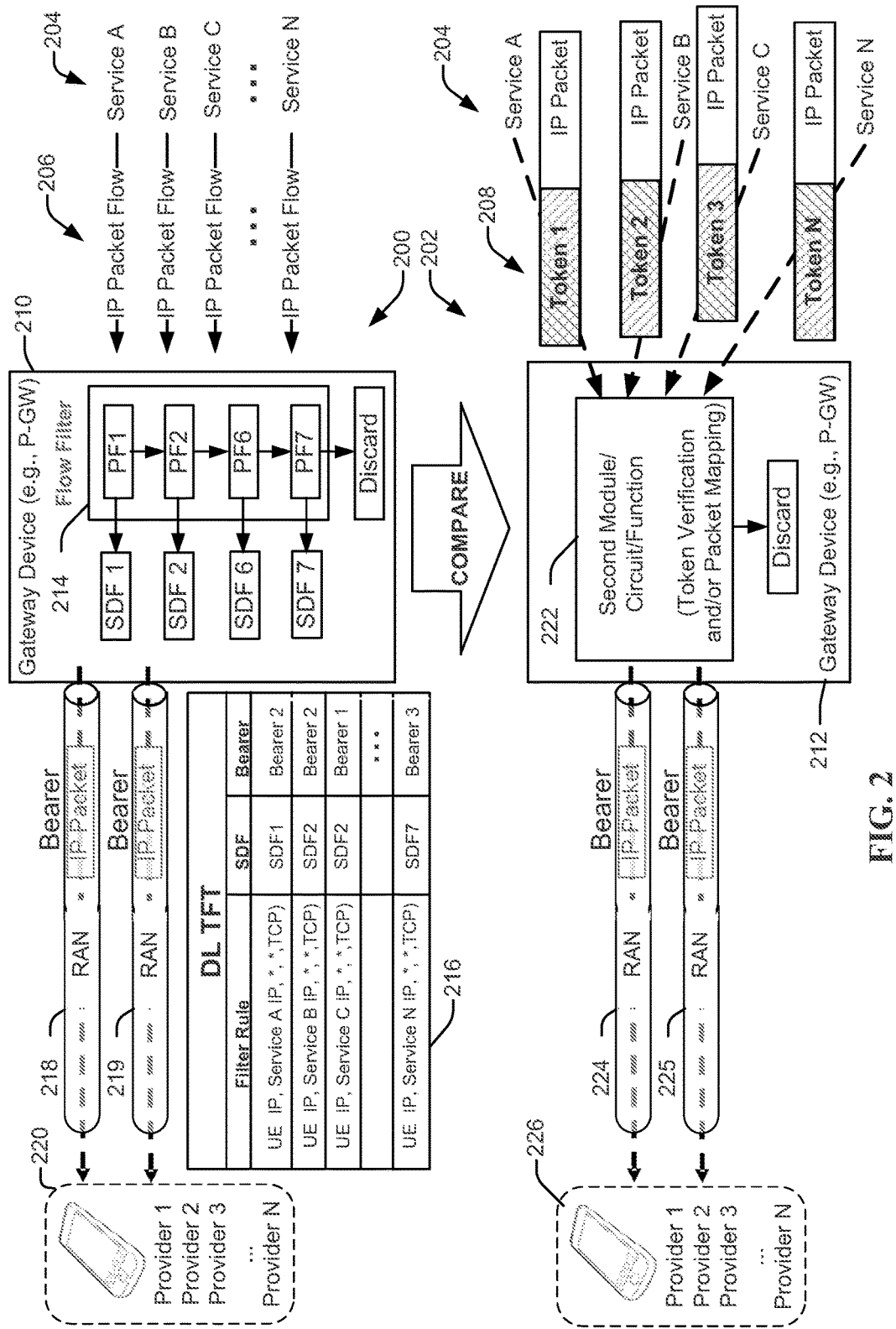
FIG. 2 provides an illustration comparing a present Service Data Flow/Traffic Flow Template (SDF/TFT) approach to an exemplary implementation according to aspects described herein.

FIG. 2 provides an exemplary illustration comparing a Service Data Flow/Traffic Flow Template (SDF/TFT) approach 200 to an exemplary implementation 202 according to aspects described herein. In the exemplary illustration, the gateway of the core network is represented by a first P-GW 210; however, reference to "P-GW" is not intended to limit any aspects described herein to any generation of technology (e.g., 2G, 3G, 4G, 5G). For example, a 5G network (e.g., a 5G core network) including aspects described herein may be implemented with a gateway referred to as a user-plane gateway (UP-GW). Accordingly, as used in this description a P-GW may be, or may be equivalent to, a UP-GW. In the exemplary illustration, Services A-N 204, where N is a positive integer, provide first packet flows 206 and second packet flows 208 to a first P-GW 210 and a second P-GW 212, respectively. First packet flows 206 do not have traffic filtering tokens included (e.g., embedded, associated) with each IP packet. Second packet flows 208 do have traffic filtering tokens (e.g., Token 1, Token 2, Token 3, . . . , Token N) included (e.g., embedded, associated) with each IP packet.

First P-GW 210 utilizes SDF/TFT templates 214 in conjunction with traffic flow template filtering rules 216 to validate and map downlink IP packets to packet flows or bearers such as bearer 218 and bearer 219, and ultimately to devices 220. Second P-GW 212 utilizes a second module/circuit/function 222 to validate and/or map second packet flows 208 (e.g., downlink IP packets including traffic filtering tokens) to packet flows or bearers such as bearer 224 and bearer 225, and ultimately to devices 226. The second module/circuit/function 222 may implement a cryptographic process or may implement some other, non-cryptographic, process.

A greater efficiency may be obtained in the processes of validating and/or mapping by replacing, or augmenting, at the P-GW, the use of SDF/TFT templates 214 (and associated tables that include traffic flow template filtering rules 216) and table lookup procedures, with a use of network access tokens as described in the exemplary aspects presented herein.

Validating and/or mapping using traffic filtering tokens may be implemented using the second module/circuit/function 222. A traffic filtering token may be used, among other things, to establish a priority of the packet, to verify the source of a downlink data packet, and/or to map the downlink data packet to a packet flow or a bearer, such as bearer 224 or bearer 225 (e.g., IP-CAN bearers). In one aspect, a traffic filtering token may be based on, for example, a device subscription profile, a network policy (e.g., a network traffic policy), and/or a service agreement with a non-core network entity. In one aspect, the network policy may be based on an application service associated with a device 226. The use of the second module/circuit/function 222 to supplement/enhance downlink data packet filtering may provide at least the following advantages over the present SDF/TFT method of downlink policy enforcement.

Scalability: No table entries or states need to be kept on a fast-path (or fast-pass) of a processing circuit.

Low latency: A single operation may be sufficient for access control.

Flexibility: a traffic filtering token may be constructed based on various meta data. Various policies (e.g., the authenticity/authorization of packets) can be applied to and/or reflected in traffic filtering tokens.

Distributed Denial of Service (DDoS) resilience: Efficient filtering of unauthorized downlink traffic by a gateway device (e.g., UP-GW, P-GW) at a border of a core network (e.g., before the downlink traffic enters the core network), for example, by discarding downlink traffic that fails verification (e.g., discarding a downlink data packet whose included traffic filtering token failed verification).

Relocatability: Relocating SDF filters can be done via key transfer (e.g., using Network Functions Virtualization (NFV)). Note: a filtering rule (or a set of rules) may be defined by or mapped to a corresponding key.

Exemplary Operating Environment

Figure 3:
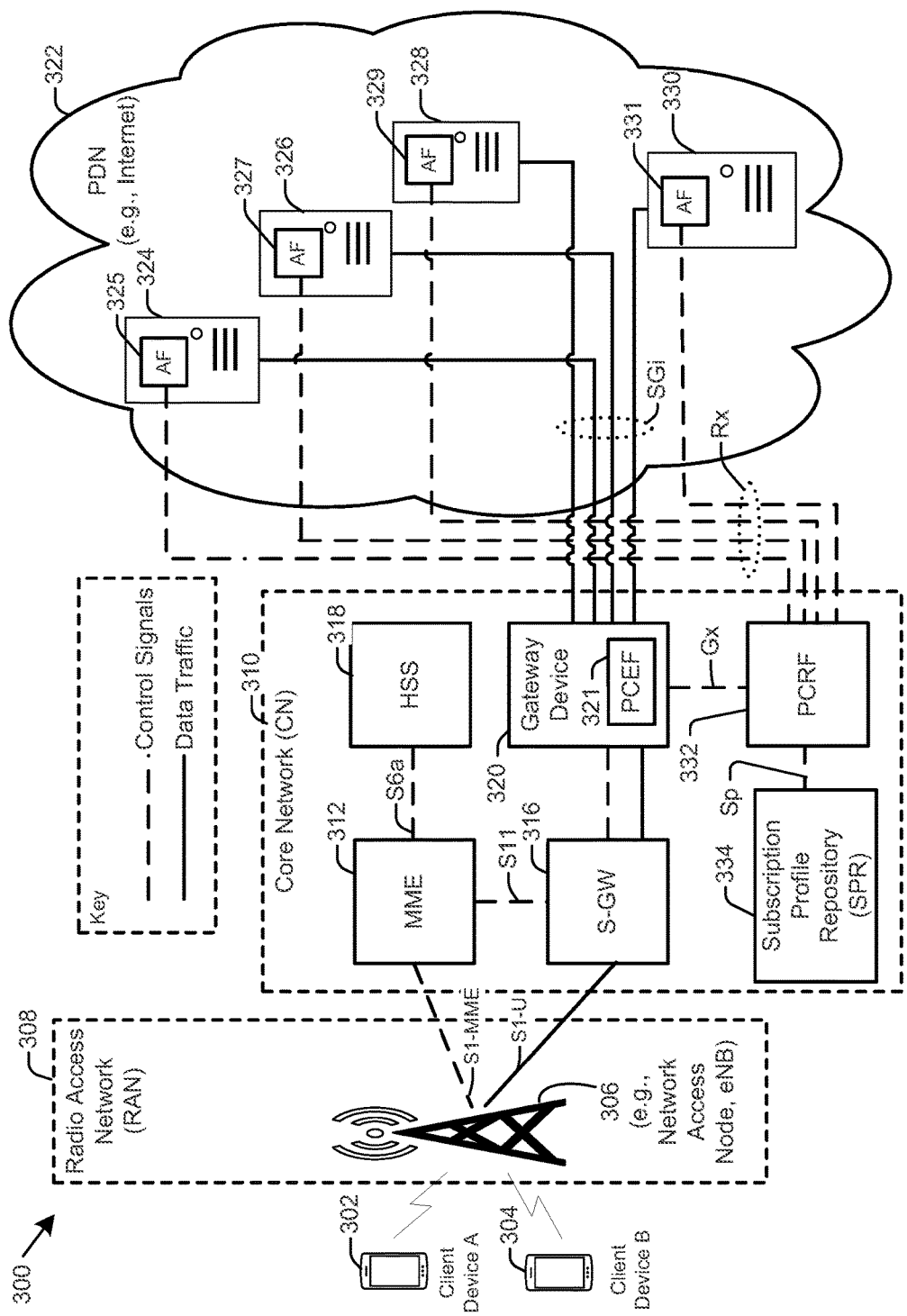
FIG. 3 illustrates an exemplary operating environment in accordance with aspects described herein.

FIG. 3 illustrates an exemplary operating environment 300 in accordance with aspects described herein. In such an exemplary operating environment 300 one or more devices 302, 304 (e.g., client device A, client device B) may communicate wirelessly with an access node 306 (e.g., Node B, eNodeB (eNB), access point (AP)). The access node 306 may be included within a radio access network (RAN) 308 (e.g., enhanced universal terrestrial radio access network (E-UTRAN)). As known to those of skill in the art, the RAN 308 may include more than one access node 306. FIG. 3 illustrates only one access node 306 to reduce clutter.

In a non-limiting example of a cellular communication network (e.g., 4G, LTE, LTE-A), control signals and data traffic may be communicated between the RAN 308 and a core network (CN) 310 (e.g., an evolved packet core (EPC)). Control signals may be communicated via an S1-MME interface. Data traffic may be communicated via an S1-U interface.

In the illustration of FIG. 3, broken lines represent control signaling paths, solid lines represent data traffic paths. A control-plane conveys control signals (e.g., control-plane signaling). A user-plane conveys user data (e.g., user-plane messages).

A CN 310 may include a mobility management entity (MME) 312, a serving gateway device (S-GW) 316, a home subscriber server (HSS) 318, a gateway device 320 (e.g., UP-GW, P-GW), a policy and charging enforcement function (PCEF) 321, and a policy and charging rules function (PCRF) 332. The PCRF 332 may be coupled to a subscription profile repository (SPR) 334. The PCRF 332 may also be coupled to one or more application functions such as AF 325, AF 327, AF 329, AF 331. Application functions such as AF 325, AF 327, AF 329, AF 331 may be associated with or included with corresponding applications and/or application services hosted on one or more application servers.

The gateway device 320 may communicate in the user-plane with a packet data network (PDN) 322 (e.g., the Internet). More specifically, the gateway device 320 may communicate in the user-plane with servers such as application servers 324, 326, 328, 330. Communication between the gateway device 320 and application servers such as application servers 324, 326, 328, 330 may be conducted via an SGi interface in the user-plane. The PCRF 332 may communicate in the control-plane with application functions such as AF 325, AF 327, AF 329, AF 331. Communication between the PCRF 332 and application functions such as AF 325, AF 327, AF 329, AF 331 may be conducted via an Rx interface. The application servers 324, 326, 328, 330 may be associated with service providers, such as, for example, service providers that provide sales services, information services, streaming video services, and social media services. The application servers 324, 326, 328, 330 may host applications and/or application services. The application servers 324, 326, 328, 330 may include or be associated with one or more application functions such as AF 325, AF 327, AF 329, AF 331.

Each of the application servers 324, 326, 328, 330 may be considered as a user-plane (or data-plane) entity, while each of the application functions such as AF 325, AF 327, AF 329, AF 331 may be considered as a control-plane (or signaling-plane) entity.

Figure 4:
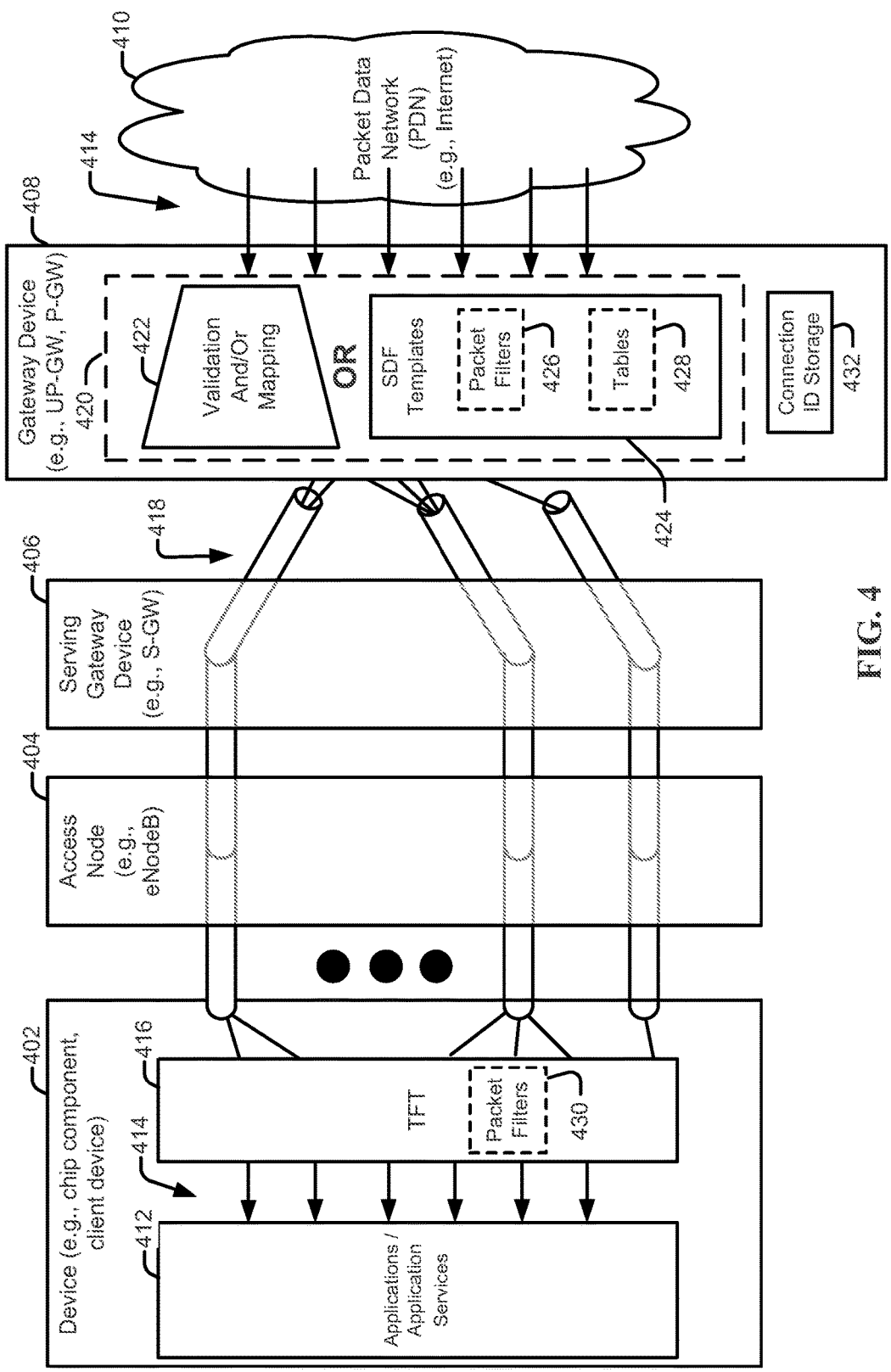
FIG. 4 is an example of a downlink operation in accordance with aspects described herein.

FIG. 4 is an example of a downlink operation in accordance with aspects described herein. The example is presented in the context of a long term evolution (LTE) cellular communication network for convenience. The example is not intended to place any limitation on the scope of any aspects described herein.

Represented in FIG. 4 are a device 402 (e.g., chip component, client device, user equipment, user device, terminal, mobile device), an access node 404 (e.g., eNodeB), a serving gateway device (S-GW) 406, a gateway device 408 (e.g., UP-GW, P-GW), and a PDN 410 (e.g., the Internet).

The exemplary downlink operation in FIG. 4 is now described. Downlink Packet flows 414 (e.g., flows of IP packets in the user-plane toward the device 402 from application servers (not shown) in the PDN 410) may be applied to a decision and processing module/circuit/function 420 of the gateway device 408. The number of downlink packet flows 414 depicted is illustrative and not intended to be limiting. The decision and processing module/circuit/function 420 may cause packets received from the downlink packet flows 414 (referred to herein as downlink data packets) to be passed/forwarded/sent/transferred/applied to a validation and/or mapping module/circuit/function 422 or to service data flow (SDF) templates 424 and packet filters therein 426. In one aspect, the validation and/or mapping module/circuit/function 422 may implement a cryptographic process. In another aspect, the validation and/or mapping module/circuit/function 422 may implement a non-cryptographic process.

Downlink data packets having traffic filtering tokens and/or packet-set markings included (e.g., embedded, associated) with the downlink data packets may be passed to the validation and/or mapping module/circuit/function 422.

In one implementation, a traffic filtering token including an application identifier (App ID) may be included (e.g., embedded, associated) with a downlink data packet. The App ID may be used to determine a network traffic policy. The App ID may be different from a packet-set marking. The network traffic policy may be retrieved from an application server. In some aspects, the application server may be a first application server, which initiated a request to communicate with a device, or it may be a second application server with which the device seeks to initiate communication; however, a third application server is also acceptable. In some aspects, the network traffic policy may be retrieved from an application function (AF) associated with an application server. In other aspects, the network traffic policy may be retrieved from a subscription profile repository (SPR).

The network traffic policy may be based, for example, on a quality of service (QoS) profile or an access control list (ACL). Traffic policies may be instituted, for example, in connection with application services to ensure that a device is not violating any agreements, is being provided access to subscribed application services, and/or is being provided with an agreed upon level of service (e.g., QoS). Such traffic policies may be enforced by the gateway device 408, and in some aspects may additionally or alternatively be enforced by a RAN (or by an access node 404 of the RAN), against downlink data packets sent from the application server toward a device. By way of additional example, such traffic policies may be used to enforce a rule that allows a device to receive downlink data packets from a pre-defined set of application services. By way of another example, the traffic policies may be used to apply distinct charging or handling to packets associated with certain application services and/or devices.

In some implementations, the network traffic policy may include Quality of Service (QoS) parameters including, for example, service priority, maximum bandwidth, guaranteed bandwidth, and/or maximum delay. This information may be used by the validation and/or mapping module/circuit/function 422, to map (e.g., by decrypting the traffic filtering token and using data included in the decrypted traffic filtering token) each downlink data packet associated with a traffic filtering token to a particular packet flow or bearer from among a plurality of packet flows or bearers 418 (e.g., evolved packet system (EPS) or IP-CAN bearers).

Downlink data packets in the downlink packet flows 414 that do not have traffic filtering tokens included (e.g., embedded, associated) therewith may be sent to the SDF templates 424 by the decision and processing module/circuit/function 420. Packet filters 426 may be included with the SDF templates 424. The use of the packet filters 426 of the SDF templates 424 may require more processing and memory resources than does the use of the validation and/or mapping module/circuit/function 422. To perform filtering using the packet filters 426 of the SDF templates 424, the gateway device 408 may need to maintain table(s) 428 having separate table entries for each SDF. Each table entry may require identification of multiple parameters, such as, but not limited to App ID, maximum bit rate (MBR), and access point name-aggregate maximum bit rate (APN-AMBR). The packet filters 426 of the SDF templates 424 may map (e.g., by the filtering process) each downlink data packet that does not include a traffic filtering token to a particular packet flow or bearer from among the plurality of packet flows or bearers 418.

Three packet flows or bearers 418 are illustrated for demonstrative purposes. In one aspect, a packet flow or bearer can be shared by multiple applications/application services. Each of the packet flows or bearers 418 may be associated with a unique set of parameters.

Downlink packet flows 414 can be mapped, for example, to a default packet flow or bearer or to one or more dedicated packet flows and/or one or more bearers. The default packet flow or the default bearer may have a non-guaranteed bit rate, while a dedicated packet flow or dedicated bearer may have either guaranteed or non-guaranteed bit rates. The packet flows or bearers 418 may pass through the S-GW 406 and access node 404 (e.g., eNodeB). Aspects of the access node 404 (e.g., eNodeB) and S-GW 406 are not described herein and are known to those of ordinary skill in the art.

Upon reaching the device 402, the downlink packet flows 414 in the various packet flows or bearers 418 may be applied to packet filters 430 included with a traffic flow template (TFT) 416. The packet filters 430 of the TFT 416 filter, or otherwise direct, the downlink packet flows 414 from the plurality of packet flows or bearers 418 to their respective applications/application services 412 in the device 402. In one aspect, at least one of the packet flows or bearers 418 may be shared by multiple applications/application services 412. The number of downlink packet flows 414 and packet flows or bearers 418 depicted herein are illustrative and not intended to be limiting.

Two exemplary types of traffic filtering tokens may be described in connection with aspects described herein. A first type may be referred to as an identification token (see FIG. 5). A second type may be referred to as a self-contained token (see FIG. 6).

In one implementation, an identification token may be used to identify specific traffic (e.g., a packet flow). The identification token may provide for efficient access control and/or efficient admission control for a service. For example, an identification token may be bound to a specific application. When an entity of a core network (e.g., a control-plane entity such as an MME, MMF, AMF, SMF, and/or a PCRF) derives an identification token, after authorizing traffic associated with the specific application and associating a QoS policy with the identification token, packet filtering/matching may no longer need to be based on an SDF/TFT approach; instead, as explained above, a packet associated with the identification token (i.e., a first type of traffic filtering tokens) may effectively be filtered/matched based on a token verification process.

Use of a token verification process may provide for stateless filtering (e.g., at a gateway device 408 (e.g., a UP-GW, a P-GW) and/or at a RAN (e.g., an access node 404 of a RAN) of DL packets. The token verification process may filter unauthorized traffic from an incoming DL packet stream by verifying an identification token associated with a given packet. A failed token verification may result in the dropping (e.g., discarding) of the associated packet. Use of the token verification process may eliminate a need to keep track of flow states. In one aspect, where for example the token is generated using a key, verification of the identification token can be performed with knowledge of the key used to derive the identification token.

The identification token may also be used for QoS policy enforcement. The identification token may identify, or be associated with, a specific QoS policy. Once the identification token is verified, the QoS policy may be determined and applied to the packet associated with the identification token. In some aspects, the QoS policy may be delivered to the entity verifying the token (e.g., a gateway device 408 and/or a RAN).

Implementation of an identification token provides for flexibility in terms of policy enforcement. For example, an identification token can be revoked at any time and/or can be established to have a predefined lifetime (e.g., set-up to be time-limited). One way to revoke an identification token may be by changing the key used to derive the token (e.g., changing the token generation key). Additionally, a gateway device 408 (e.g., UP-GW, P-GW) (or another core network entity) can set the lifetime of the identification token without negotiation with a device or an application server (i.e., no sync required to set the lifetime).

Figure 5:
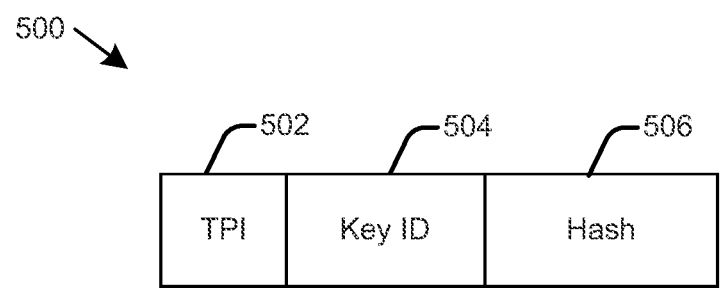
FIG. 5 illustrates the content of an exemplary identification token in accordance with aspects described herein.

FIG. 5 illustrates the content of an exemplary identification token 500 in accordance with aspects described herein. In one aspect, the identification token 500 may include a token parameter index (TPI) 502, which may identify parameters of a data packet header used to derive the identification token 500 (e.g., indicates which parameters may be used for a hash). The identification token 500 may further include a key index (Key ID) 504, which may identify a key used to derive the identification token 500. The identification token 500 may also include a keyed hash 506 of the parameters identified by the TPI 502.

In one implementation, a self-contained token (i.e., a second type of a traffic filtering token) may be used to identify specific traffic (e.g., a packet flow). The self-contained token may provide for efficient access control and/or efficient admission control for a service. For example, a self-contained token may be bound to a specific application. When an entity of a core network (e.g., a control-plane entity such as an MME, MMF, AMF, SMF, and/or a PCRF) derives a self-contained token, after authorizing traffic associated with the specific application and associating a QoS policy with the self-contained token, packet filtering/matching may no longer need to be based on an SDF/TFT approach; instead, as explained above, a packet associated with the self-contained token may effectively be filtered/matched based on a token verification process.

Use of a token verification process may provide for stateless filtering as well as stateless policy enforcement (e.g., at a gateway device and/or at a RAN) of DL packets. As described in connection with the identification token, the token verification process may filter unauthorized traffic from an incoming DL packet stream by verifying a self-contained token associated with a given packet. Additionally, because a self-contained token includes a traffic flow policy, the included traffic flow policy can be applied to the packet associated with the table without a need to maintain a traffic flow policy state table. In one aspect, verification of the self-contained token can be performed with knowledge of the key used to derive the self-contained token.

The self-contained token may also be used for QoS policy enforcement. The self-contained token, as the name implies, may have included (e.g., embedded) therein one or more of a flow policy, an access control rule, and a QoS rule. Alternatively, the self-contained token may have included therein one or more identifiers or index/index values representative of one or more of a flow policy, an access control rule, and a QoS rule. Once the self-contained token is verified, the one or more of the flow policy, the access control rule, and the QoS rule may be applied to the packet associated with the self-contained token.

Implementation of a self-contained token provides for flexibility in terms of policy enforcement. For example, the self-contained token can be revoked at any time and/or can be established to have a predefined lifetime (e.g., set-up to be time-limited). One way to revoke a self-contained token may be by changing the key used to derive the token (e.g., changing the token generation key). Additionally, a gateway device (e.g., UP-GW, P-GW) (or another core network entity) can set the lifetime of the self-contained token without negotiation with a device or an application server (i.e., no sync required to set the lifetime).

Figure 6:
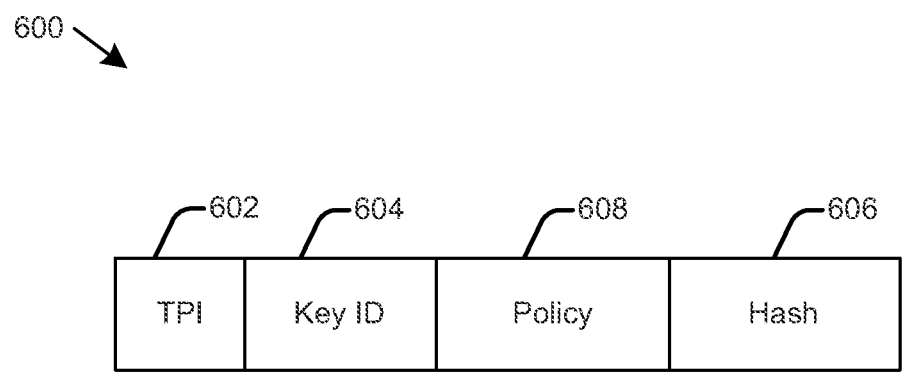
FIG. 6 illustrates the content of an exemplary self-contained token in accordance with aspects described herein.

FIG. 6 illustrates the content of an exemplary self-contained token 600 in accordance with aspects described herein. In one aspect, the self-contained token 600 may include a token parameter index (TPI) 602, which may identify parameters of a data packet header used to derive the self-contained token 600 (e.g., indicates which parameters may be used for a hash). The self-contained token 600 may further include a key index (Key ID) 604, which may identify a key used to derive the self-contained token 600. The self-contained token 600 may also include a policy 608 (or policy identifier or index), which may define a treatment (e.g., in terms of flow, access, and/or QoS) of the packet associated with the self-contained token 600. The self-contained token 600 may also include a keyed hash 606 of the parameters identified by the TPI 602.

Token derivation and provisioning will now be described. One or more core network control-plane entities/functions (e.g., MME, MMF, AMF, SMF, and/or PCRF) may derive a traffic filtering token. One or more core network user-plane devices/entities/functions (e.g., gateway device (e.g., UP-GW, P-GW)) and/or a RAN may verify the traffic filtering token and apply treatments associated with the traffic filtering token to a packet associated with the traffic filtering token.

According to an aspect, at QoS establishment, an application function (AF) associated with an application server may interact with the core network control-plane device/entity/function to request QoS and specific packet treatment for individual packets associated with a given packet flow (e.g., packet stream, IP flow, data flow, Ethernet PDU flow, an unstructured data flow). The control-plane device/entity/function may authorize the request based, for example, on network policies and/or a device subscription profile. The control-plane device/entity/function may derive one or more traffic filtering tokens. The one or more traffic filtering tokens may be uplink (UL) tokens and/or downlink (DL) tokens) corresponding to a direction of the given packet flow.

The control-plane device/entity/function may provision one or more traffic filtering tokens to the AF together with indication of traffic filtering token usage (e.g., an indication of which traffic filtering token can be associated with which packet). Additionally or alternatively, the control-plane device/entity/function may provision one or more one or more traffic filtering tokens as UL tokens to a device (e.g., a UE, a client device, a chip component) together with indication of traffic filtering token usage (e.g., an indication of which traffic filtering token can be associated with which UL packet).

According to an aspect, the control-plane device/entity/function may also provision one or more traffic filtering tokens to the device. According to such an aspect, the device may send (e.g., forward) the one or more traffic filtering tokens to the AF.

In some implementations, the control-plane device/entity/function may provision token-related information to the one or more user-plane devices/entities/functions. In connection with an identification token (e.g., a first type of a traffic filtering token), the token-related information may include information used to verify the token (e.g., a key, a key index) and a policy for traffic filtering and QoS associated with the token. In connection with a self-contained token (e.g., a second type of a traffic filtering token), the token-related information may include the information used to verify the token.

In connection with both the identification token and the self-contained token, the control-plane device/entity/function may also provision (e.g., deliver, send) to the one or more user-plane devices/entities/functions an indication as to whether the traffic filtering tokens can be removed from or maintained in the packet after processing of the token is completed. For example, in the case of an exemplary 4G network, a DL data packet including a traffic filtering token may be processed to determine traffic flow and QoS rules at a gateway device (e.g., P-GW); however, in a network of the future (e.g., a 5G network) the DL data packet including the traffic filtering token may be processed to determine traffic flow and QoS rules at both the gateway device (e.g., UP-GW, P-GW) and at a RAN. In the former case it is reasonable to remove the traffic filtering token from the DL packet after processing at the gateway device (because the traffic filtering token will not undergo additional processing at any device/entity/function subsequent to the gateway device); however, in the latter case it is reasonable to maintain the traffic filtering token with the DL packet after processing at the gateway device (e.g., UP-GW, P-GW) (because the traffic filtering token will undergo additional processing at the RAN).

According to aspects described herein, an application server or AF associated with the application server may be considered an end entity for downlink traffic (e.g., traffic flowing to the device), while a device may be considered an end entity for uplink traffic (e.g., traffic flowing from the device). According to aspects described herein, each end entity may determine a traffic filtering token for a packet based on the packet's delivery requirement (e.g., each end entity may select a token to associate with a selected packet based on the selected packet's delivery requirement. Each end entity may map a traffic filtering token to a selected packet. Additionally, each end entity includes (e.g., embeds) the selected traffic filtering token with the selected packet.

Token usage will now be described. With respect to usage of an identification token, the control-plane device/entity/function may provision the identification token verification key and the associated traffic filtering policy (e.g., QoS) for a token corresponding to a packet flow to a user-plane device/entity/function. Data traffic filtering and policing (e.g., QoS enforcement) may be performed at the user-plane device/entity/function. The user-plane device/entity/function may verify the identification token and enforce the QoS (or prioritization) based on the associated traffic filtering policy received from the control-plane device/entity/function.

With respect to usage of a self-contained token, the control-plane device/entity/function may provision the self-contained token verification key for the self-contained token corresponding to a packet flow to a user-plane device/entity/function. Data traffic filtering and policing (e.g. QoS enforcement) may be performed at the user-plane device/entity/function. There is no need to provision an associated traffic filtering policy because the policy is already included with the self-contained token. Accordingly, no further state is delivered to the user-plane device/entity/function. The user-plane device/entity/function may verify the self-contained token and enforces the QoS (or prioritization) based on the associated traffic filtering policy included in the self-contained token.

Packet Prioritization within a Flow Via Differentiated Tokens

In several aspects, different packets within a single packet flow may have different QoS requirements. For example, certain packets may require guaranteed delivery while other packets in the same packet flow may not require guaranteed delivery; instead, the other packets may require best-effort delivery. Additionally, it may be appreciated that dropping or delaying certain packets in a given packet flow with respect to other packet in the same packet flow may impact the user and application experience in terms of quality of experience (QoE). However, packet differentiation, for QoS and/or for scheduling (e.g., priority) within a packet flow, which relies on the traditional TFT/SDF approach, requires inspection (e.g., deep packet inspection and/or shallow packet inspection) and analysis of each packet and may therefore be expensive and time consuming. As an example of additional expense and consumption of time, one may consider that in future networks, such as 5G, application detection may occur at a RAN and also may occur in the core network (e.g., at a UP-GW), thus doubling the inspection requirements.

Furthermore, networks may be embracing end-to-end encrypted packet flow (e.g., Transport Layer Security (TLS), Hypertext Transfer Protocol (HTTP) over TLS (HTTPS) (also known as HTTP over Secure Socket Layer (SSL), and HTTP Secure)). In a network using end-to-end encrypted packet flow, packet inspections may be inefficient, unsuccessful, and may not be possible (e.g., if the network is not permitted or able to decrypt each packet).

For an end-to-end encrypted flow a core network entity (e.g., gateway device, a UP-GW, a P-GW) and a RAN, which stand between an application server and a device, may have difficulty in enforcing QoS selectively for different packets of the same packet flow.

According to one aspect described herein, per-packet QoS for encrypted packets may be achieved by differentiation of individual packets in a packet flow. According to such an aspect, multiple classes of tokens may be derived for a given packet flow.

For example, at QoS establishment, an application function (AF) of an application server may interact with a core network control-plane device/entity/function to request a QoS treatment for individual packets in a given packet flow, and an indication of the different types of packets and the priorities associated with the different types of packets. As used herein, a QoS treatment is understood to mean the enforcement of a QoS policy or QoS rule when receiving and forwarding the packets. QoS treatment can, as an example, take place in a user plane entity in the core network, or in an access network node to map the packet according to the QoS policy or QoS rule to a specific radio resource (e.g. a dedicated radio bearer) that provides transport over the radio and respects the QoS parameters in the QoS policy or QoS rule (e.g. by selecting a specific radio bearer).

In an aspect, the control-plane device/entity/function may obtain multiple classes of traffic filtering tokens for the given packet flow based on, for example, the request of the AF, device subscription information, and/or network policies (e.g., core network policies). Obtaining may be done beforehand or dynamically as-needed. As used herein, obtaining multiple classes of traffic filtering tokens may include deriving multiple classes of traffic filtering tokens for the given packet flow as a function of, for example, the request of the AF, device subscription information, and/or network policies. In an aspect, obtaining the multiple classes of traffic filtering tokens for the given packet flow may occur during quality of service (QoS) establishment negotiation between the control-plane device/entity/function and a non-core network entity. By way of example, the multiple classes of traffic filtering tokens may include: Token 1 (associated with guaranteed delivery); Token 2 (associated with high priority); . . . ; Token N (associated with best-effort delivery), where N is a positive integer. The control-plane device/entity/function may provision the multiple classes of traffic filtering tokens (e.g., Token 1, Token 2, . . . , Token N) and token usage information to the AF (and/or, in some aspects, to the device). Token usage information may indicate, for example, which class of token to use with each type of packet and/or priority.

Additional token information may be provisioned to the devices/entities/functions verifying the tokens, such as the user-plane gateway (UP-GW) device and the RAN. The additional token information may include information used to verify each of the multiple classes of tokens (e.g., Key 1, Key 2, . . . , Key N) and, in the case of an identification token, the policy for traffic filtering and QoS associated with each of the multiple classes of tokens.

Figure 7:
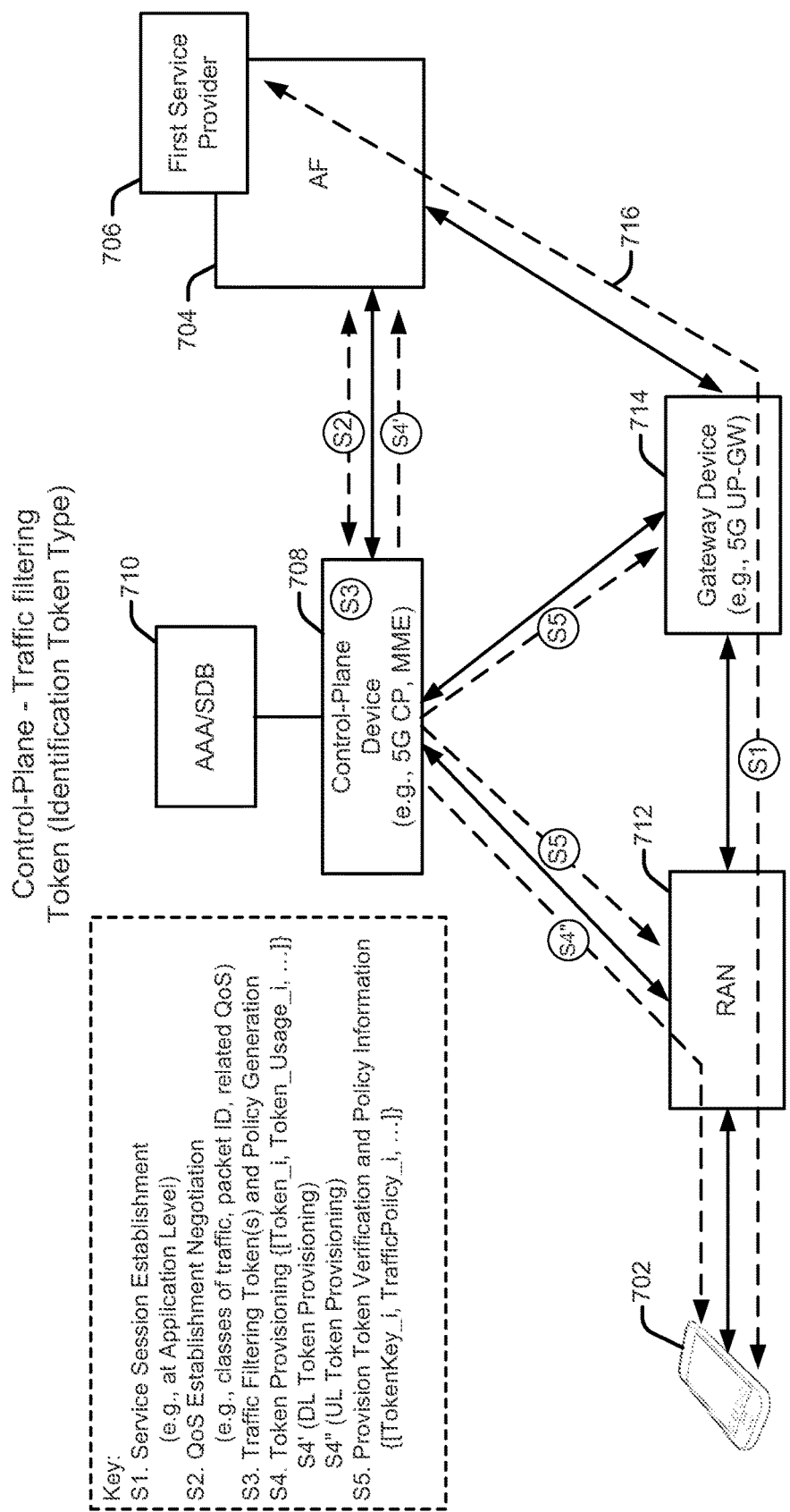
FIG. 7 is a reference architecture associated with control-plane signaling involving use of an identification token in accordance with aspects described herein.

FIG. 7 is a reference architecture associated with control-plane signaling involving use of an identification token in accordance with aspects described herein.

In the exemplary implementation of FIG. 7, a device 702 and an application function (AF) 704 of an application server (not shown) may establish a service session (e.g., at the application level) over application level signaling S1. As used herein, reference to an AF can be understood as a reference to an AF of an application server or other entity or node (not shown). The service session may include a single packet flow 716 between the AF 704 and the device 702, where the single packet flow 716 is associated with a first service provider 706. The AF 704 may a send a request, for individualized quality of service (QoS) treatment of packets in the single packet flow 716, to a core network control-plane device/entity/function 708. The core network control-plane device/entity/function 708 may be operationally coupled to a Authentication, Authorization, and Accounting/Subscriber Database (AAA/SDB) server device 710. Responsive to the request, the AF 704 and core network control-plane device/entity/function 708 may enter into a QoS establishment negotiation S2. The QoS establishment negotiation may relate, for example, to classes of traffic, packet identification, QoS related to each class of traffic, priority related to each class of traffic, and the like. Upon completion of QoS establishment negotiation, the core network control-plane device/entity/function 708 may derive one or more identification tokens (e.g., may derive multiple classes of identification tokens) and associated policies S3. The core network control-plane device/entity/function 708 may provision the AF 704 with the one or more tokens and token usage information S4'. In some aspects, the core network control-plane device/entity/function 708 may provision the device 702 with a different one or more tokens and token usage information S4". The core network control-plane device/entity/function 708 may also provision, to the user-plane RAN device/entity/function 712 and the user-plane gateway device/entity/function 714 (e.g., UP-GW, P-GW), token verification and policy information S5. It is noted that the order of signaling messages (e.g., S1-S5) in FIG. 7 is only exemplary; for example, the order may change such that S5 occurs before S4.

Figure 8:
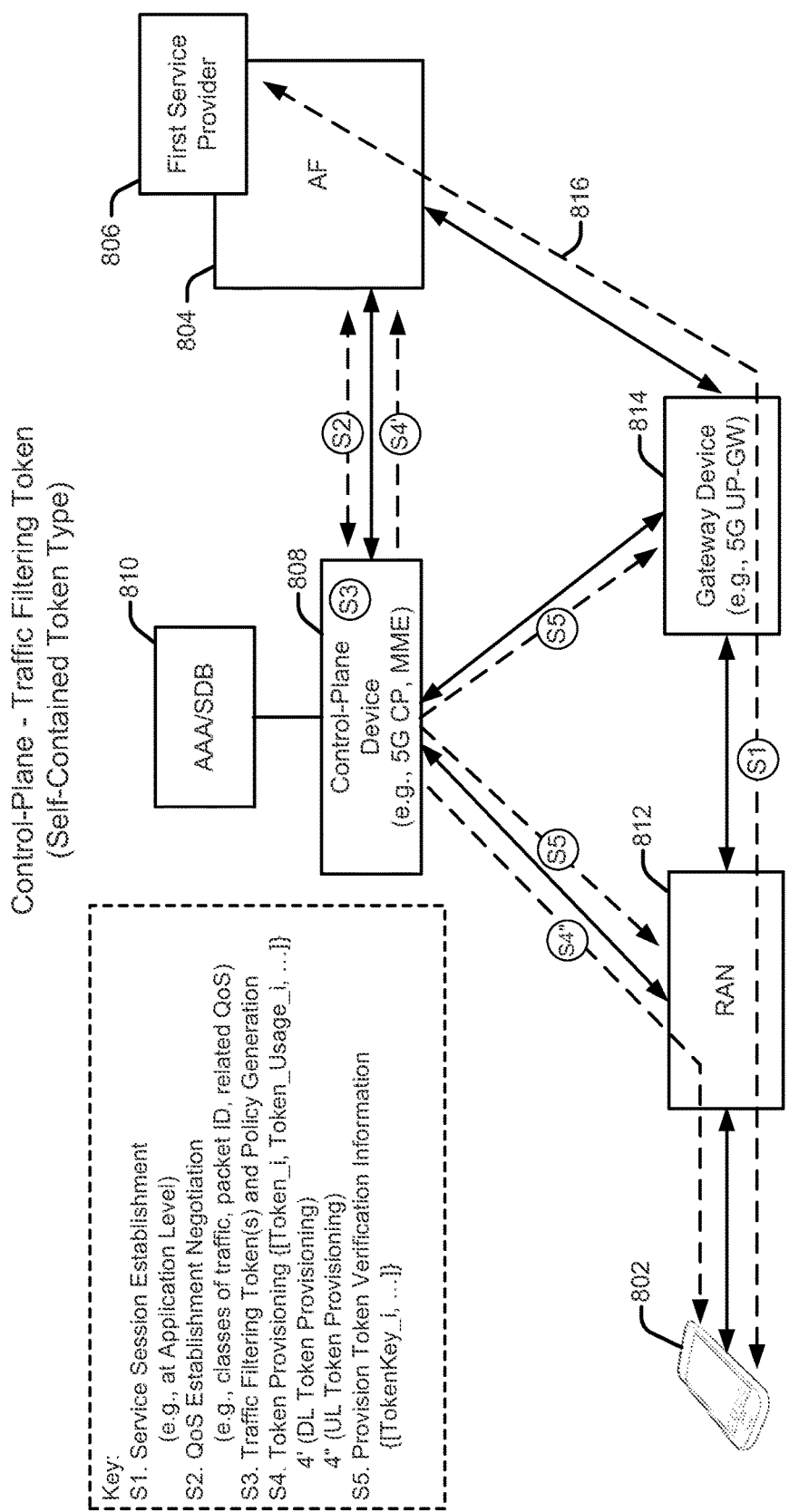
FIG. 8 is a reference architecture associated with control-plane signaling involving use of a self-contained token in accordance with aspects described herein.

FIG. 8 is a reference architecture associated with control-plane signaling involving use of a self-contained token in accordance with aspects described herein.

In the exemplary implementation of FIG. 8, a device 802 and an application function (AF) 804 of an application server (not shown) may establish a service session (e.g., at the application level) over application level signaling S1. As used herein, reference to an AF can be understood as a reference to an AF of an application server or other entity or node (not shown). The service session may include a single packet flow 816 between the AF 804 and the device 802, where the single packet flow 816 is associated with a first service provider 806. The AF 804 may a send a request, for individualized quality of service (QoS) treatment of packets in the single packet flow, to a core network control-plane device/entity/function 808. The core network control-plane device/entity/function 808 may be operationally coupled to an Authentication, Authorization, and Accounting/Subscriber Database (AAA/SDB) server device 810. Responsive to the request, the AF 804 and core network control-plane device/entity/function 808 may enter into a QoS establishment negotiation S2. The QoS establishment negotiation may relate, for example, to classes of traffic, packet identification, QoS related to each class of traffic, priority related to each class of traffic, and the like. Upon completion of QoS establishment negotiation, the core network control-plane device/entity/function 808 may derive one or more self-contained tokens (e.g., may derive multiple classes of self-contained tokens) and associated policies S3. The core network control-plane device/entity/function 808 may provision the AF 804 with the one or more tokens and token usage information S4'. In some aspects, the core network control-plane device/entity/function 808 may provision the device 802 with a different one or more tokens and token usage information S4". The core network control-plane device/entity/function 808 may also provision, to the user-plane RAN device/entity/function 812 and the user-plane gateway device/entity/function 814 (e.g., UP-GW, P-GW), token verification information S5. Policy information is already included in each self-contained token. It is noted that the order of signaling messages (e.g., S1-S5) in FIG. 8 is only exemplary; for example, the order may change such that S5 occurs before S4.

Figure 9:
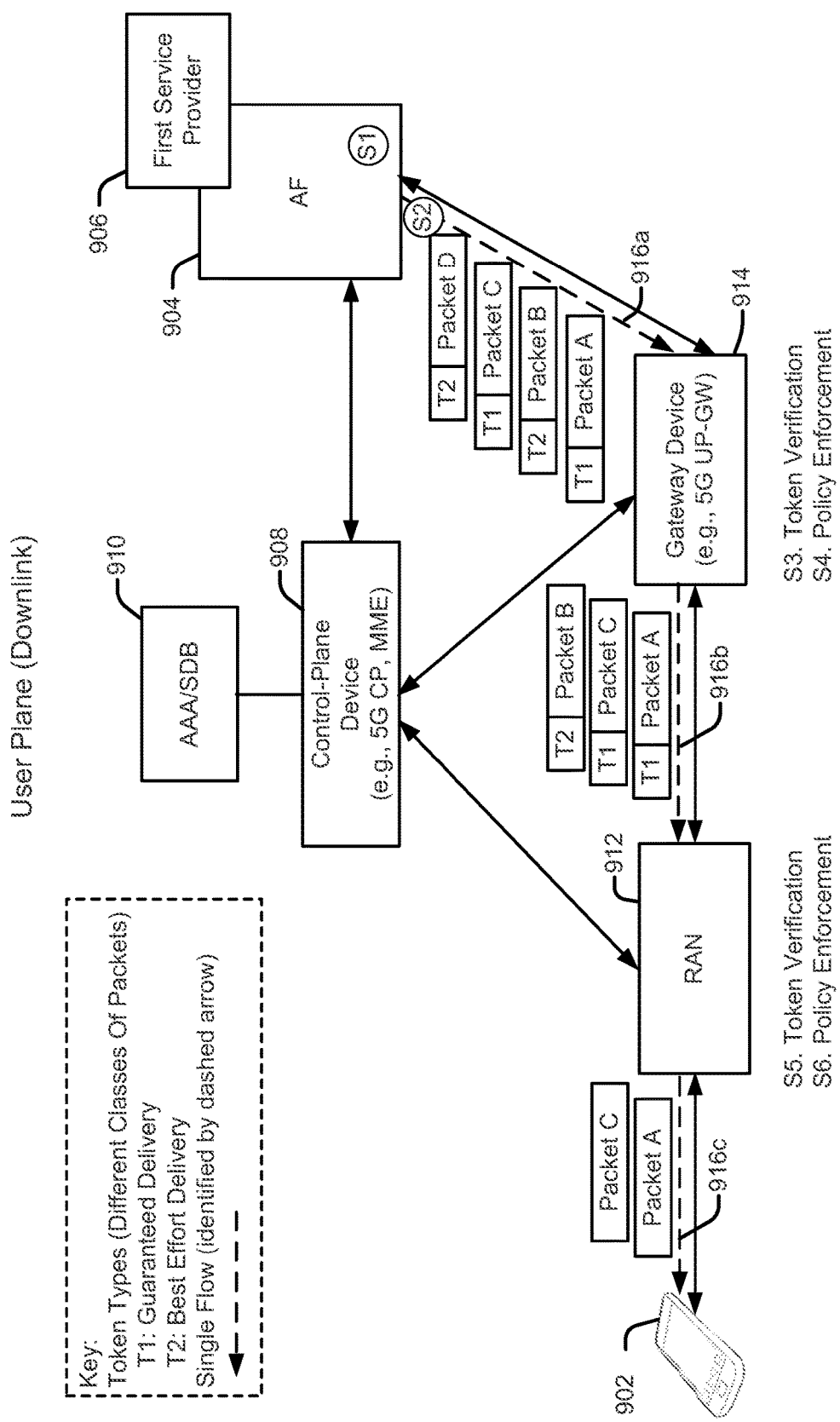
FIG. 9 is a reference architecture associated with user-plane data having tokens included with (e.g., embedded in) data packets associated with a single flow in accordance with aspects described herein.

FIG. 9 is a reference architecture associated with user-plane data having tokens included with (e.g., embedded in) data packets associated with a single flow in accordance with aspects described herein.

In the exemplary implementation of FIG. 9, a device 902 and an application function (AF) 904 of an application server (not shown) may have established a service session (e.g., at the application level) over application level signaling. The service session may include a single packet flow 916 (shown in three segments 916*a*, 916*b*, 916*c*) between the AF 904 and the device 902, where the single packet flow 916 may be associated with a first service provider 906. The AF 904, responsive to a request for individualized quality of service (QoS) treatment of packets in the single packet flow, sent to the core network control-plane device/entity/function 908, may have obtained a plurality traffic filtering tokens derived to differentiate between packets based on quality of service (QoS) and/or priority and token usage information, to facilitate mapping the plurality of traffic filtering tokens to individual packets in the packet flow. In addition, the core network control-plane device/entity/function 908 may have provisioned the user-plane RAN device/entity/function 912 and the user-plane gateway device/entity/function 914 (e.g., UP-GW, P-GW) with token verification and policy information.

In an aspect, the AF 904 may create a downlink data packet and may determine which type of traffic filtering token to include with (e.g., embed in) the downlink data packet S1. The AF 904 may therefore select and map the selected traffic filtering token to the downlink data packet using the token usage information. The AF 904 may include the selected traffic filtering token in the downlink data packet S2. The AF 904 may send the downlink data packet, which includes the selected traffic filtering tokens to the device 902.

In the exemplary illustration of FIG. 9, four data packets having traffic filtering tokens T1 and T2 are illustrated as being sent from the AF 904 to the UP-GW 914. For each packet obtained at the UP-GW 914, the UP-GW 914 verifies the traffic filtering token associated with the packet S3 and enforces the policy associated with traffic filtering tokens on the data in the packet S4.

As shown in FIG. 9, two packets having tokens associated with guaranteed delivery (e.g., tokens identified as "T1") are delivered to the user-plane RAN device/entity/function 912. However, only one of the packets having tokens associated with best effort delivery (e.g., tokens identified as "T2") was delivered to the user-plane RAN device/entity/function 912.

In the exemplary illustration of FIG. 9, the two data packets having tokens T1 and the one data packet having token T2 are illustrated as being sent from the UP-GW 914 to the user-plane RAN device/entity/function 912. For each packet obtained at user-plane RAN device/entity/function 912, the user-plane RAN device/entity/function 912 verifies the traffic filtering token associated with the packet S5 and enforces the policy associated with traffic filtering token on the data in the packet S6. As shown in FIG. 9, two packets having tokens associated with guaranteed delivery (e.g., tokens identified as "T1") are delivered to the device 902. However, the packet having a token associated with best effort delivery (e.g., tokens identified as "T2") was not delivered to the device 902, for example, due to congestion. The exemplary illustration of FIG. 9 accordingly illustrates the concept of packet prioritization within a single flow via differentiated traffic filtering tokens (T1, T2).

Scheduling Mechanisms and their Issues for Dynamic Scheduling

The QoS of packets in a specific packet flow may change during the lifetime of a packet flow. As appreciated by those of skill in the art, the packets of a specific packet flow associated, for example, with a service session may not be sent at one time in one block. In many instances, the packets of the specific packet flow may be sent in sets over time.

However, flow level QoS (or traditional bearer-based QoS), where all packets of a given flow are assumed to have the same QoS, cannot easily support scheduling such as "Video object deadline-aware scheduling." In "Video object deadline-aware scheduling" the RAN needs to prioritize the packets of a video object when a deadline for delivery of the packets of the video object is approaching. On one hand, if the deadline is close and if the RAN cannot deliver the video object to a device (e.g., a UE) by the deadline, the video playout can stall. On the other hand, if the deadline is far, the RAN may wait for a better opportunity (e.g., better channel status, low cell load) to schedule the packets of the video object.

To complicate matters, the deadline information is only known by the video client of the device. By way of example, the deadline information could be: the current video playout buffer level (i.e., the amount of time the buffered video objects can play); or the expected playout time, which may vary due, for example, to the user dragging the fast forward or backward button and/or to the video client inserting an advertisement.

To overcome at least some of these issues, it may be desirable to enable a flow to have dynamic priority (e.g., dual priority at a minimum) without requiring QoS renegotiation. To provide dynamic priority to packets of the same flow, for example over a given period of time, in some cases a given priority is used, while in other cases a different priority is used for the same flow. For example, when a deadline of delivery of a set of packets approaches, those packets may need to be handled with a higher priority by e.g., a RAN. The aspects described in the present section may relate to how a device (e.g., UE) can request a change to the priority of handling a set/block of packets, to the core network. As described herein, the change to the priority may only apply to the requested set/block of packets. After those packets are processed as requested, then the core network may revert to processing the packets of that flow with the priority associated with that flow before obtaining the request to change the priority.

According to aspects described herein, a RAN may receive QoS information relevant to a deadline-aware service, and apply the received QoS information to deadline-aware scheduling. The RAN may then apply special scheduling (e.g., temporary scheduling, modified scheduling) for the packet flow that handles the deadline-aware service, which requires the special scheduling.

According to aspects described herein, a discard timer may be implemented in the RAN (e.g., in an eNB) for downlink (DL) packets. The RAN (e.g., eNB) may monitor the current scheduling delay for each packet and prioritize if necessary to avoid excess delay.

Two mechanisms are found in current cellular networks for scheduling management of packet flows. First, Packet Delay Budget (PDB) establishes a target for transmission of packets associated with SDF aggregates. The PDB is monitored by a scheduler function in the RAN. If the scheduler function determines that the PDB of all SDF aggregates cannot be met, then the scheduler gives precedence to meeting the PDB of the SDF aggregates with the highest priority level. Second, Flow Priority Indication (FPI) is a marking added by the PDN GW to downlink packets and establishes a relative priority between packets associated with the same bearer (hence they have the same QoS), as an example, to provide the relative priority of various packet flows using the same bearer or of different packet flows of the same device. A RAN node, as an example, under congestion situations, gives precedence to packets having an FPI marking that indicates a higher relative priority.

PDB supports the configuration of scheduling and link layer functions (e.g., the setting of scheduling priority weights and HARQ target operating points). PDB is interpreted as a maximum delay with a confidence level of 98 percent. Therefore, it is possible today to define a PDCP SDU discard timer based on this. PDB, as explained, defines a maximum delay between a PCEF (which is in a P-GW) and a device (e.g., UE) that needs to be respected to 98% of correctness, and after which delivering packets that may not meet the deadline is unnecessary (as the packets would be useless at the device) and therefore the uplink (UL) packets may be discarded at the P-GW. Because the P-GW-to-device path includes multiple nodes (e.g., other GW (S-GW), switches, RAN node), the precise delay cannot be known to the P-GW. A QoS Class Identifier (QCI) and SDF aggregate are associated with a Priority level and a Packet Delay Budget (PDB). Clause 6.1.7.2 of 3GPP TS 23.203 defines that if the target set by the PDB can no longer be met for one or more SDF aggregate(s) across all UEs that have sufficient radio channel quality then a scheduler shall give precedence to meeting the PDB of SDF aggregates with higher Priority level.

In a User Plane Congestion (UPCON) management solution, a Flow Priority Indication (FPI) has been added to determine relative priority between packets (TR 23.705). FPI is determined by packet data network gateway for downlink data. FPI complements QCI and is not intended to replace the QCI, and no conflicts are foreseen between the FPI and the QCI. Both the FPI marking of each user plane packet and the Priority level associated to a Service Data Flow (SDF) aggregate via its QCI are used to differentiate between packet flows of the same UE, and are also used to differentiate between packet flows of different UEs. For downlink traffic of a single UE with a certain QCI, in congestion situations, the RAN node gives precedence to packets having an FPI marking which indicates a higher relative priority.

However, there are issues with both PDB and FPI. First, in connection with PDB, the PDB for a given QCI value is the same for both uplink (UL) and downlink (DL). It may be useful, however, to have different values for the UL and the DL to enable differentiation. When a DL value and a UL value of PDB are introduced, the delay budget applies differently to UL and DL traffic in order to cater for different types of data sent in UL and in DL for the same packet flow and the same service. The DL PDB value may be derived similarly to the PDB value for the UL, or may be set by the PCRF function in the core network depending on specific service requirements and delivered to one or more user-plane functions (e.g. PCEF, UP-GW, RAN, etc.).

Also, the PDB is applied to all packets in a packet flow, it is not possible to associate a specific set of, or block of, packets within a packet flow with a PDB that is different from the PDB provided for the remainder of the packets with the packet flow. Furthermore, a device (e.g., UE) has no impact on the value of the PDB and cannot signal a PDB value to a RAN (e.g., to an eNB of the RAN). Currently the RAN (e.g., eNB) deduces the PDB from the QCI characteristics defined in Table 6.1.7 of 3GPP TS 23.203, and the same PDB applies to all packets within a given bearer.

Second, in connection with FPI, similar to PDB, FPI does not allow differentiating between different packets or sets or blocks of packets within a specific packet flow.

Use of Packet-Set Marking (Identification Values) for Differentiation of Packet Treatment According to aspects described herein, there are provided methods and apparatus that may enable a device-triggered packet differentiation within a packet flow (with dynamically variable priority) that does not require QoS re-negotiation between the device and the core network. Three exemplary aspects are described herein.

A first aspect involves an application function (AF) and may be based on additional marking (e.g., packet-set marking, identification value) added to a packet. As used herein, the terms "packet-set marking" and "identification value" may be used interchangeably. As used herein, an identification value may be a packet-set marking or a token. A second aspect also involves the AF and may be based on packet prioritization within a flow via differentiated tokens. The second aspect will be described in terms of two sub-aspects. The first sub-aspect will be described in connection with use of a block of packets. The second sub-aspect will be described in connection with use a specific subset of packets. A third aspect will also be described. The third aspect may be implemented without AF involvement.

First Aspect: Differentiation of Packet Treatment with AF Involvement Based on Additional Marking The exemplary first aspect may be based on the inclusion of an additional marking to a DL packet, where the marking may be added to the DL packet by the AF. The additional marking may be used by a RAN to identify which scheduling information from a device (e.g., UE) applies to the DL packet. The additional marking may, for example, relate to a new scheduling request from the device to a specific set (or block) of packets that may be sent from, for example, between a first time, t1, and a second and later time, t2, and that may be identified by a special marking, referred to herein as a packet-set marking or an identification value.

Packet-set marking may apply in the case where no token is assigned to a packet flow, one token is assigned to a packet flow, or multiple tokens are assigned to the packet flow. In aspects described herein, packet-set marking may not be dependent on the use of tokens. For example, a control-plane function may send packet-set marking to a device (e.g., a UE), in such a way that the packet-set marking it is not dependent on the use of tokens.

According to the first aspect as described herein, a DL packet, which may include a traffic filtering token, sent to a device by an AF may include a packet-set marking that identifies the DL packet as belonging to a set of packets associated with the same packet-set marking. The packet-set marking is in addition to and distinct from the use of traffic filtering tokens for the same packet flow (which may be considered as a marking identifying different types of packets within a packet flow), if applied (e.g., different and separate from a token used to identify a type of packet in a set of packets).

Figure 10A:
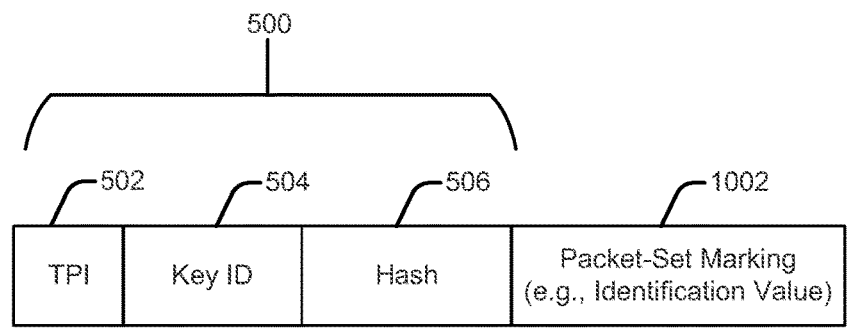
FIG. 10A illustrates the addition of a packet-set marking to an identification token and FIG. 10B illustrates the addition of a packet-set marking to a self-contained token all in accordance with aspects described herein.
Figure 10B:
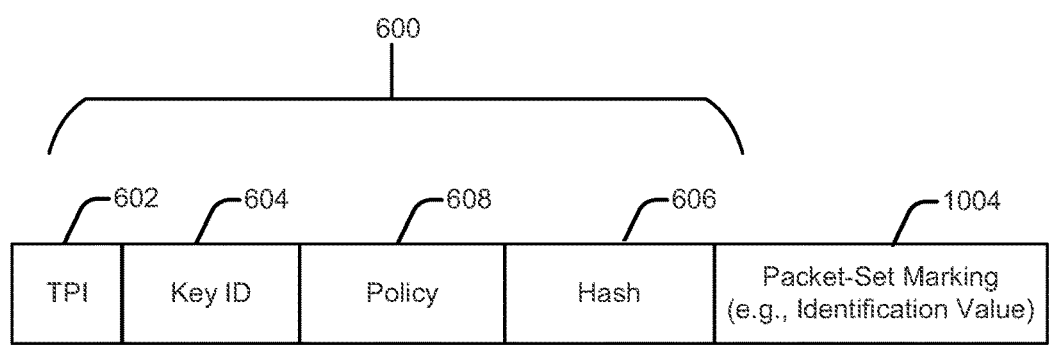

FIG. 10A illustrates the addition of a packet-set marking 1002 to an identification token 500 and FIG. 10B illustrates the addition of a packet-set marking 1004 to a self-contained token 600 all in accordance with aspects described herein. In some aspects, the packet-set marking may be embedded with or otherwise attached to a packet without being associated with an identification token 500 or a self-contained token 600.

The device (e.g., UE) can be aware of the addition of the packet-set marking made to the packet by the AF in at least two ways.

Option 1: The device defines the packet-set marking and sends it to the AF up-front (e.g., before the AF begins marking the packets to which the packet-set marking applies). The device may send the packet-set marking to the AF, for example, in application level signaling, By way of example, the packet-set marking may define how an AF creates a set/block of packets and puts the marking in each packet (e.g., 100 packets belong to a same set/block and hence the packet-set marking changes for all 100 packets). Accordingly, the device can inform the AF of the marking rule (e.g., the packet-set marking) before AF starts marking packets. Thus, according to some aspects, the packet-set marking (e.g., identification value) may be based on a pre-negotiation with a source of the packets in the packet flow that marked the first set of packets with the identification value; where, in this example, the source of the packets may be the AF. Where the pre-negotiation occurs before the AF begins marking packets.

Option 2: The packet-set marking may be decided between the AF and the control-plane device/entity/function during, for example, QoS establishment negotiations (or, for example, during token setup), and may be provisioned (e.g., communicated, delivered) to the device when the control-plane function provisions DL traffic filtering token information to the device. As indicated, according to Option 2, the control-plane device/entity/function may provision at least some information related to the DL traffic filtering token to the device. With the use of Option 2, the device does not need to communicate with the AF to set how packets are marked.

By way of example, packet-set marking may include marking of sets of packets with data (e.g., an identification value) corresponding to, or indicating, for example "set_i," where i is a positive integer (e.g., "set_1", "set_2", etc.). When a device identifies new packets marked with set i+1, the device may determine that set_i is terminated.

In general, the packet-set marking may be as simple as a binary marking, indicating just the change of a set of similarly identified packets. However, packet-set marking may be more complex than binary marking and is not limited to binary marking.

According to the first aspect described herein, the device may provide updated priority information to that RAN by providing scheduling-related information to the RAN so that adaptive scheduling, or modified scheduling, can be used by the RAN. In one aspect, the device may provide the scheduling-related information in order to override (e.g., temporarily change) current scheduling information. In another aspect, the device may provide scheduling-related information and information on how to identify which packets the scheduling-related information applies to.

Providing scheduling-related information, or other indications, from device to RAN may be accomplished either in-band (e.g., in PDCP signaling by modifying the PDCP header or adding a new sub-header, in data radio bearers (DRBs) (i.e., bearers for user-plane data traffic)) or out-of-band (e.g., in RRC signaling by re-using existing signaling or by defining new signaling messages and procedures, in signaling radio bearers (SRBs) (i.e., bearers for control-plane signaling)).

According to one implementation, the RAN may be configured to know for which packet flows the device is authorized to change the scheduling priority, and possibly how to change the scheduling priority (e.g. to what extent to change the scheduling priority). For example, when a policy with respect to a packet flow is given by the control-plane device/entity/function (e.g., given by a Session Management device/entity/function) to a user plane device/entity/function (e.g. the RAN), the policy may include an indication of whether the device is allowed to request to modify the scheduling priority in real-time.

According to the first aspect described herein, the packet-set marking may be used in addition to a traffic filtering token, or separate and apart from a traffic filtering token, in at least the following exemplary ways:

For cases in which QoS enforcement is not based on FPI, either:

A) the device may send scheduling-related information to the RAN when the device detects the start of a set of packets, together with the information about the marking of the set of packets; or B) the device may send an indication of a change of scheduling priority for a set of packets when a deadline for delivery of the set of packets is approaching. The timing as to "when a deadline for delivery of the set of packets is approaching" may be implementation dependent.

Additionally, for non-FPI cases, the device may send the packet-set marking for a specific set of packets to the RAN and either:

A) the deadline, and the RAN applies higher priority scheduling to the packets corresponding to the packet-set marking; or B) a new value of Packet Delay Budget (PDB) that overrides a current value of PDB for the packet flow, where the new value of PDB applies only to the current set of packets, and the RAN reinstates the PDB established at packet flow setup once the set of packets is terminated (e.g., when the packet-set marking of the set of packets changes, indicating that the previous set of packets is terminated). According to such an aspect, the device knows the deadline and may provide a PDB value to the RAN to meet the deadline.

For cases in which QoS enforcement is based on FPI, the device may request to the RAN to modify the FPI associated with the packets in a downlink data flow dynamically depending on the scheduling urgency, and may also send the packet-set marking for a specific set of packets to the RAN. According to this aspect, the device may send an override FPI value associated with a specific set of packets—and may provide the packet-set marking—that overrides the FPI value established by a gateway (e.g., a UP-GW, a P-GW), for example, for a certain period of time or for a certain set of packets. The RAN may apply the override FPI value to packets corresponding to the packet-set marking for a specific set of packets. For example, as explained above, packet-set marking may define a set/block of packets (which might be binary, i.e., either 0 or 1, where packets with marking 1 belongs to the same set/block). Packet-set marking may not include the priority information. FPI may define priority, so for the packets that need urgent handling, FPI overrides the priority in the token that may be associated with a packet. The RAN may reinstate the FPI value assigned by the gateway at packet flow establishment once the set of packets is terminated (e.g., the packet-set marking of the packets in the data flow changes. As used and described herein, the packet-set marking changes when the packet-set is finished, but does not change while the data is still in the same packet-set.

Additionally, for FPI cases, the device may still provide the deadline, and the RAN may give priority by considering deadline and the FPI value (i.e., RAN does not consider only the FPI value).

Second Aspect, First Sub-Aspect: Use Packet Prioritization within a Flow Via Differentiated Tokens for a Set of Packets According to the second aspect, first sub-aspect, as described herein, when a device detects a need to change a priority of packets, or the device otherwise determines to change the priority of packets, the device may interact with an AF and indicate that packets belonging to a current set of packets can be marked with the highest priority token (e.g., the token of the class with the highest priority from the existing traffic filtering tokens derived for the current set of packets). The AF, responsive to the indication of the device, may change the token associated with the packets belonging to the current set of packets to the highest priority token. When the next set of packets starts, the AF may resume using the original tokens.

According to this second aspect, first sub-aspect, a use of differentiated tokens (e.g., tokens that represent, for example, at least two distinct priority levels) may help in assigning different Packet Delay Budgets (PDBs) to different sets of packets within a packet flow. To implement this second aspect, first sub-aspect, a PDB may be derived in a way that may be distinct and different from a traditional way of deriving the PDB. For example, according to this second aspect, first sub-aspect, the PDB may be based on a QCI and a specific PDB value pre-defined in a QoS policy, where each PDB value may be associated with a specific token. Basing the PDB on the QCI and the specific PDB value may stand in contrast, for example, to basing the PDB on only the QCI. For example, the QCI may be defined for nine values; therefore, basing the PDB on the QCI and the specific PDB value may provide for implementation of a more fine-grained policy. Different packets in a packet flow may be marked with different tokens, and the token-specific PDB may be applied.

Second Aspect, Second Sub-Aspect: Use Packet Prioritization within a Flow Via Differentiated Tokens for a Specific Subset of Packets According to the second aspect, second sub-aspect, as described herein, when a device detects a need to change a priority of specific packets that are being marked by a specific token (as in the case of the solution for packet differentiation within a flow), or the device otherwise determines to change the priority of specific packets that are being marked by a specific token, the device may send to the RAN:

A) the specific DL token associated to the packet whose priority is to be changed; and B) new scheduling-related information.

It is noted that reference may be made to the section of this disclosure, above, under the heading "First Aspect: Use Of DL Token For Differentiation Of Packet Treatment With AF Involvement Based On Additional Marking" for examples of how a device may send this information to the RAN.

According to this second aspect, second sub-aspect, the RAN may apply the scheduling-related information (either for FPI-based or non-FPI-based cases) to the packet corresponding to the DL token provided by the device. According to this second aspect, second sub-aspect, the RAN may apply the scheduling-related information (either for FPI-based or non-FPI-based cases) only to the packet corresponding to the DL token provided by the device.

Third Aspect: Use of DL Token for Differentiation of Packet Treatment without AF Involvement According to the third aspect as described herein, an AF may not be involved. In other words, according to this third aspect, an AF may not request QoS from the core network and/or may not add a DL token to a packet. Instead, for example, a gateway device (e.g., a UP-GW, a P-GW), when performing DPI on DL traffic may add a token to the DL traffic being sent towards the RAN.

This third aspect may, for example, rely on:

A) the device sending updated "priority" or deadline as described above in connection with the first aspect described herein; and B) the device resetting priority to "return to the priority that was used before the priority update" at the end of the set of packets.

Alternatively, this third aspect may, for example, rely on the device sending a set size (e.g., a block size) and the RAN applying an override priority or deadline for the length of the packet-set size.

The device may also provide the DL token to the RAN in order to help the RAN identify which packets correspond to the updated "priority" or deadline that the UE provides to the RAN, and in order not to require the RAN to perform DPI to identify the packets.

Exemplary Control Plane Device/Entity/Function

Figure 11:
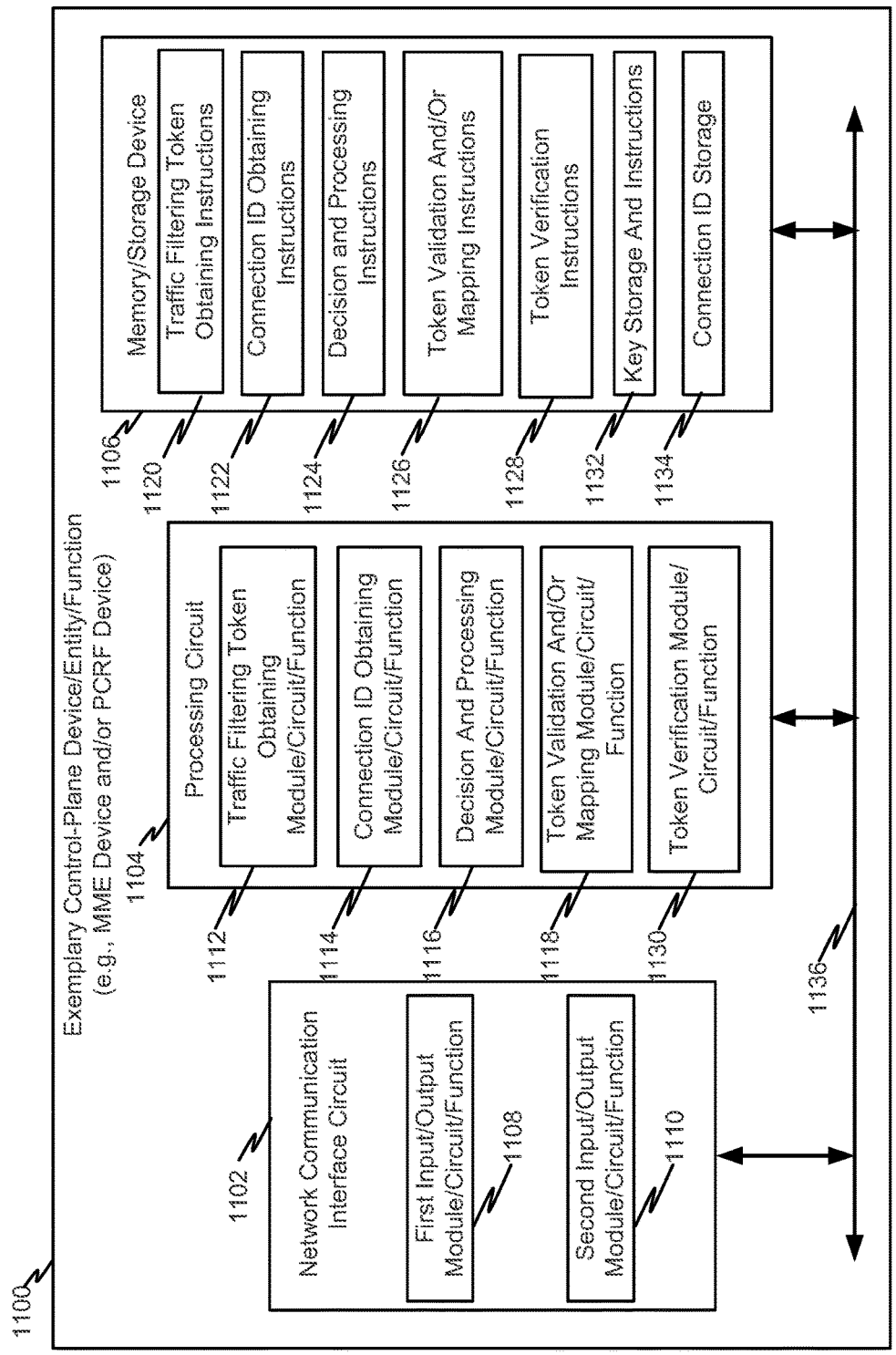
FIG. 11 is a block diagram illustrating an exemplary control-plane device/entity/function configured to support use of traffic filtering tokens for in-flow packet prioritization and data-dependent flexible QoS policy in accordance with aspects described herein.

FIG. 11 is a block diagram illustrating an exemplary control-plane device/entity/function 1100 configured to support use of traffic filtering tokens and/or packet-set marking (e.g., an identification value) for in-flow packet prioritization and data-dependent flexible QoS policy in accordance with aspects described herein. In one example, the exemplary control-plane device/entity/function 1100 may include a network communication interface circuit 1102, a processing circuit 1104 coupled to the network communication interface circuit 1102, and memory/storage device 1106 coupled to the processing circuit 1104 and the network communication interface circuit 1102. These circuits and/or devices, or any combination of them, may perform actions of detecting, identifying, sending, creating, and/or mapping. Accordingly, these circuits and/or devices, or any combination of them, may be considered as non-limiting examples of means for detecting, means for identifying, means for sending, means for creating, and/or means for mapping.

The network communication interface circuit 1102, for example, may be adapted to communicate with an application server and a communication network. The network communication interface circuit 1102 may include a first input/output module/circuit/function 1108 for communication with a RAN and/or a gateway device (e.g., UP-GW, P-GW) and a second input/output module/circuit/function 1110 for communication with an application server device and/or an application function of the application server. In some implementations, the first input/output module/circuit/function 1108 and the second input/output module/circuit/function 1110 may be the same input/output module/circuit/function. The first input/output module/circuit/function 1108 and/or the second input/output module/circuit/function 1110 may handle multiple packet flows established on multiple bearers or packet flows. The same or other input/output modules/circuits/functions may interface with other aspects of a core network, such as one or more AAA/SBD devices, PCRFs, PCEFs, etc. as known to those of skill in the art.

The processing circuit 1104 may include or implement one or more processors, application specific processors, hardware and/or software modules, etc., that may be configured to support access to wireless and wired networks and implement methods and instructions related, for example, to use of traffic filtering tokens for in-flow packet prioritization and data-dependent flexible QoS policy. For example, the processing circuit 1104 may be configured to engage in QoS establishment negotiations with an application function, derive tokens and policies associated with the tokens, provision the tokens and provision information related to the tokens. By way of further example, a traffic filtering token obtaining module/circuit/function 1112 may be adapted to obtain (e.g., derive, generate, compute, etc.) the traffic filtering token in accordance with aspects described herein. In some aspects, the processing circuit 1104 may include a connection ID obtaining module/circuit/function 1114, a decision and processing module/circuit/function 1116, a token validation and/or mapping module/circuit/function 1118 and/or a token verification module/circuit/function 1130.

The memory/storage device 1106 may be adapted to include network access token obtaining instructions 1120, Connection ID obtaining instructions 1122, decision and processing instructions 1124, token validation and/or mapping instructions 1126, token validation/verification instructions 1128, key (e.g., shared and/or unshared secret key) storage and instructions 1132, and Connection ID storage 1134. This list is non-limiting.

Communication between network communication interface circuit 1102, processing circuit 1104, memory/storage device 1106, and other components (not shown) of the exemplary control-plane device/entity/function 1100 may be through a communication bus 1136 and/or one or more additional interface busses (not shown) as known to those of skill in the art.

Exemplary Method Operational at a Control-Plane Device/Entity/Function

Figure 12:
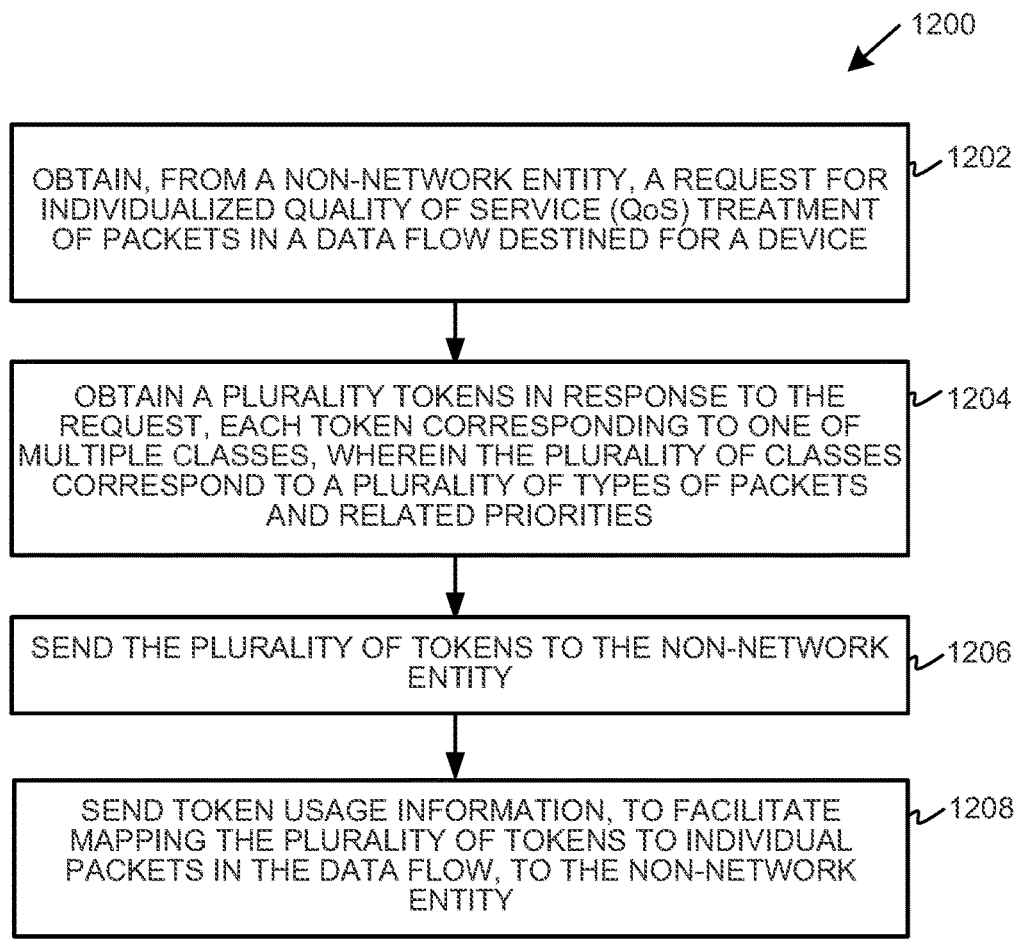
FIG. 12 is a flowchart of an exemplary method operational at a control-plane entity of a core network in accordance with aspects described herein.

FIG. 12 is a flowchart of an exemplary method 1200 operational at a control-plane entity of a core network in accordance with aspects described herein. In an aspect, the exemplary method 1200 may include obtaining, from a non-core network entity, a request for individualized quality of service (QoS) treatment of packets in a packet flow destined for a device 1202, where a service session between the device and the non-core network entity is established via the core network. In some aspects, the request may come from a core network entity or a non-core network entity. An example of a non-core network entity may be an application server operated, for example, by a third party. The exemplary method 1200 may further include obtaining a plurality of tokens in response to the request, each token corresponding to one of multiple classes, wherein the plurality of classes correspond to a plurality of types of packets and related priorities 1204. The exemplary method 1200 may still further include sending the plurality of tokens to the non-core network entity 1206. exemplary method 1200 may still further include sending token usage information, to facilitate mapping the plurality of tokens to individual packets in the packet flow, to the non-core network entity 1208.

According to an aspect, the plurality of tokens facilitate dynamic variation of a quality of service (QoS) applied to individual packets within the packet flow without requiring QoS re-negotiation between the device and the core network.

In another aspect the control plane entity authorizes the request based on a device subscription profile, network policy, and/or service agreement with the non-core network entity.

In an implementation, either: the plurality of tokens are configured to mark downlink packets and the non-core network entity is an application function of an application server; or the plurality of tokens are configured to mark uplink packets and the non-core network entity is the device. According to some aspects, the application server may be a core or non-core network entity.

In an aspect, the plurality of tokens are downlink tokens and the non-core network entity is an application function of an application server, the method further includes sending the plurality of tokens to the device in addition to sending the plurality of tokens to the application function.

In an implementation, the method further includes indicating, to user-plane network entities, whether each token of the plurality of tokens is to be removed from, or maintained with, an associated individual packet after the token is used to identify a delivery requirement of the individual packet.

In still another aspect, the method further includes sending token verification information to user-plane network entities verifying the tokens. In accordance with this aspect, the user-plane network entities include a UP-GW, a packet data network gateway, and a radio access network.

In another aspect, each token in the plurality of tokens includes: a token parameter index (TPI) that identifies parameters of a packet header used to derive the token (e.g., indicates which parameters may be used for a hash); a key index (Key ID) that identifies a key used to derive the token; and a keyed hash of the parameters identified by the TPI.

In still another aspect the method further includes sending a policy that defines packet treatment in terms of traffic filtering and QoS associated with each of the plurality of tokens, to user-plane network entities verifying the tokens.

In an implementation, each token in the plurality of tokens includes: a token parameter index that identifies parameters of a packet header used to derive the token; a key index that identifies a key used to derive the token; a policy, that defines packet treatment in terms of traffic filtering and QoS associated with the token; and a keyed hash of the parameters identified by the token parameter index.

Exemplary Application Server

Figure 13:
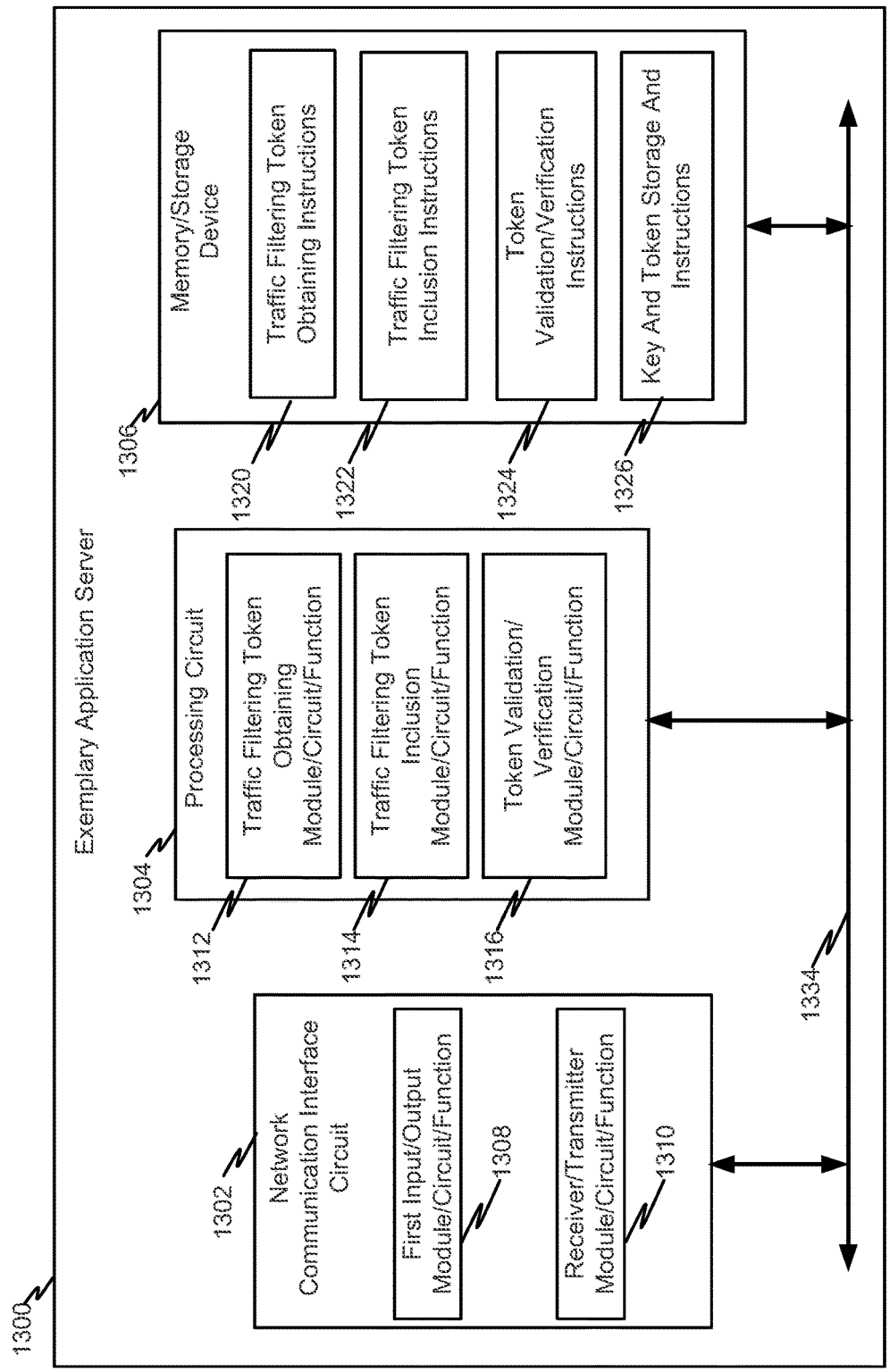
FIG. 13 is a block diagram illustrating an exemplary application server configured to support use of traffic filtering tokens for in-flow packet prioritization and data-dependent flexible QoS policy in accordance with aspects described herein.

FIG. 13 is a block diagram illustrating an exemplary application server 1300 configured to support use of traffic filtering tokens and/or packet-set marking (e.g., an identification value) for in-flow packet prioritization and data-dependent flexible QoS policy in accordance with aspects described herein. In one example, the exemplary application server 1300 may include a network communication interface circuit 1302, a processing circuit 1304 coupled to the network communication interface circuit 1302, and a memory/storage device 1306 coupled to the processing circuit 1304 and the network communication interface circuit 1302. These circuits and/or devices, or any combination of them, may perform actions of detecting, identifying, sending, creating, and/or mapping. Accordingly, these circuits and/or devices, or any combination of them, may be considered as non-limiting examples of means for detecting, means for identifying, means for sending, means for creating, and/or means for mapping.

The network communication interface circuit 1302, for example, may be adapted to communicate with a communication network. The network communication interface circuit 1302 may include a first input/output module/circuit/function 1308 for communication with a gateway device (e.g., a UP-GW, a P-GW). The network communication interface circuit 1302 may include a receiver/transmitter module/circuit/function 1310 for communication with additional entities such as a control-plane device/entity/function of the communication network.

The processing circuit 1304 may include or implement one or more processors, application specific processors, hardware and/or software modules, etc., that are adapted to support access to wireless and wired networks and implement methods and instructions related, for example, to use of traffic filtering tokens for in-flow packet prioritization and data-dependent flexible QoS policy. According to some aspects, the processing circuit 1304 may include a traffic filtering token obtaining module/circuit/function 1312, a traffic filtering token inclusion module/circuit/function 1314, and/or a token validation/verification module/circuit/function 1316. This list is non-limiting.

The memory/storage device 1306 may be adapted to include traffic filtering token obtaining instructions 1320, traffic filtering token inclusion (e.g., embedding, associating) instructions 1322, token validation/verification instructions 1324, and key (e.g., shared and/or unshared secret key) storage and token (e.g., network access token) storage and instructions 1326. This list is non-limiting.

Communication between network communication interface circuit 1302, processing circuit 1304, memory/storage device 1306, and other components (not shown) of exemplary application server 1300 may be through a communication bus 1334 and/or one or more additional interface busses (not shown) as known to those of skill in the art.

Exemplary Method Operational at an Application Server

Figure 14:
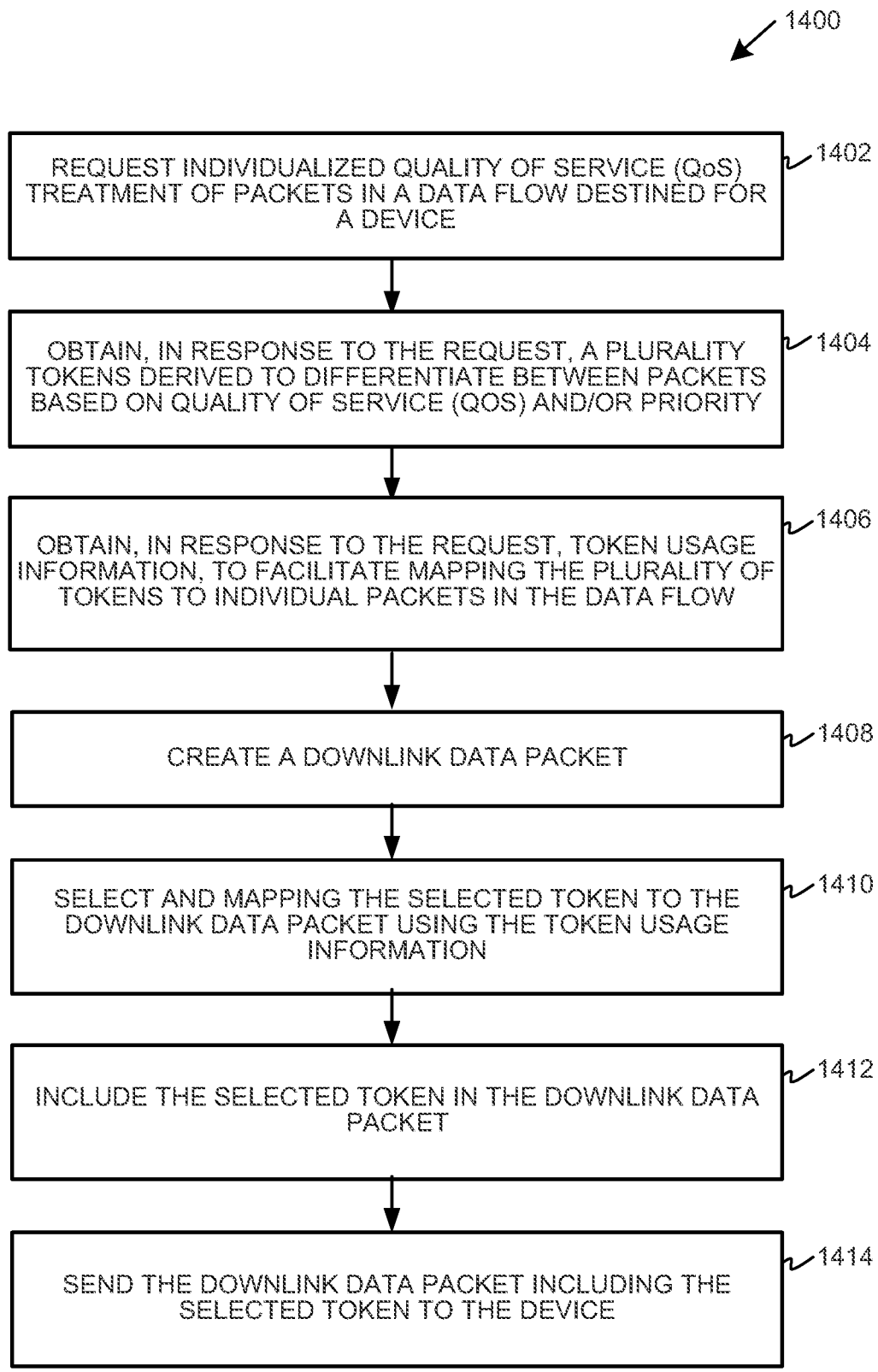
FIG. 14 is a flowchart of an exemplary method operational at an application function in accordance with aspects described herein.

FIG. 14 is a flowchart of an exemplary method 1400 operational at an application function in accordance with aspects described herein. The exemplary method 1400 may include requesting individualized quality of service (QoS) treatment of packets in a packet flow destined for a device 1402. The exemplary method 1400 may further include obtaining, in response to the request, a plurality of tokens derived to differentiate between packets based on quality of service (QoS) and/or priority 1404. The exemplary method 1400 may still further include obtaining, in response to the request, token usage information, to facilitate mapping the plurality of tokens to individual packets in the packet flow 1406. The exemplary method 1400 may yet further include creating a downlink data packet 1408. The exemplary method 1400 may further include selecting and mapping the selected token to the downlink data packet using the token usage information 1410. The exemplary method 1400 may still further comprise including the selected token in the downlink data packet 1412. Still further, the exemplary method 1400 may include sending the downlink data packet including the selected token to the device 1414.

According to an aspect, the selected token facilitates dynamic variation of the quality of service (QoS) applied to the downlink data packet within the packet flow without requiring QoS re-negotiation between the device and a core network (CN).

According to an aspect, each token of the plurality of tokens corresponds to one of a plurality of classes, wherein the plurality of classes corresponds to a plurality of types of packets and related priorities.

In one implementation, the packet flow includes a plurality of individual packets, and the method further includes: obtaining packet-set marking information, to facilitate mapping sets of the plurality of individual packets to packet-set markings. In accordance with this implementation, the packet-set marking information is obtained from the device in application level signaling.

According to another aspect, the plurality of tokens and the packet-set marking information are obtained from a control-plane entity.

In still another aspect, the aspect the method further includes: mapping the downlink data packet to a packet-set marking; and including the packet-set marking with the selected token in the downlink data packet, where the packet-set marking is distinct from the selected token. According to this aspect, the packet-set marking facilitates a RAN to differentiate between pluralities of sets of individual packets based on a value of the packet-set marking, and to dynamically adjust timing of delivery of a set of packets associated with the same packet-set marking based on scheduling information provided by the device.

Exemplary User-Plane Device/Entity/Function

Figure 15:
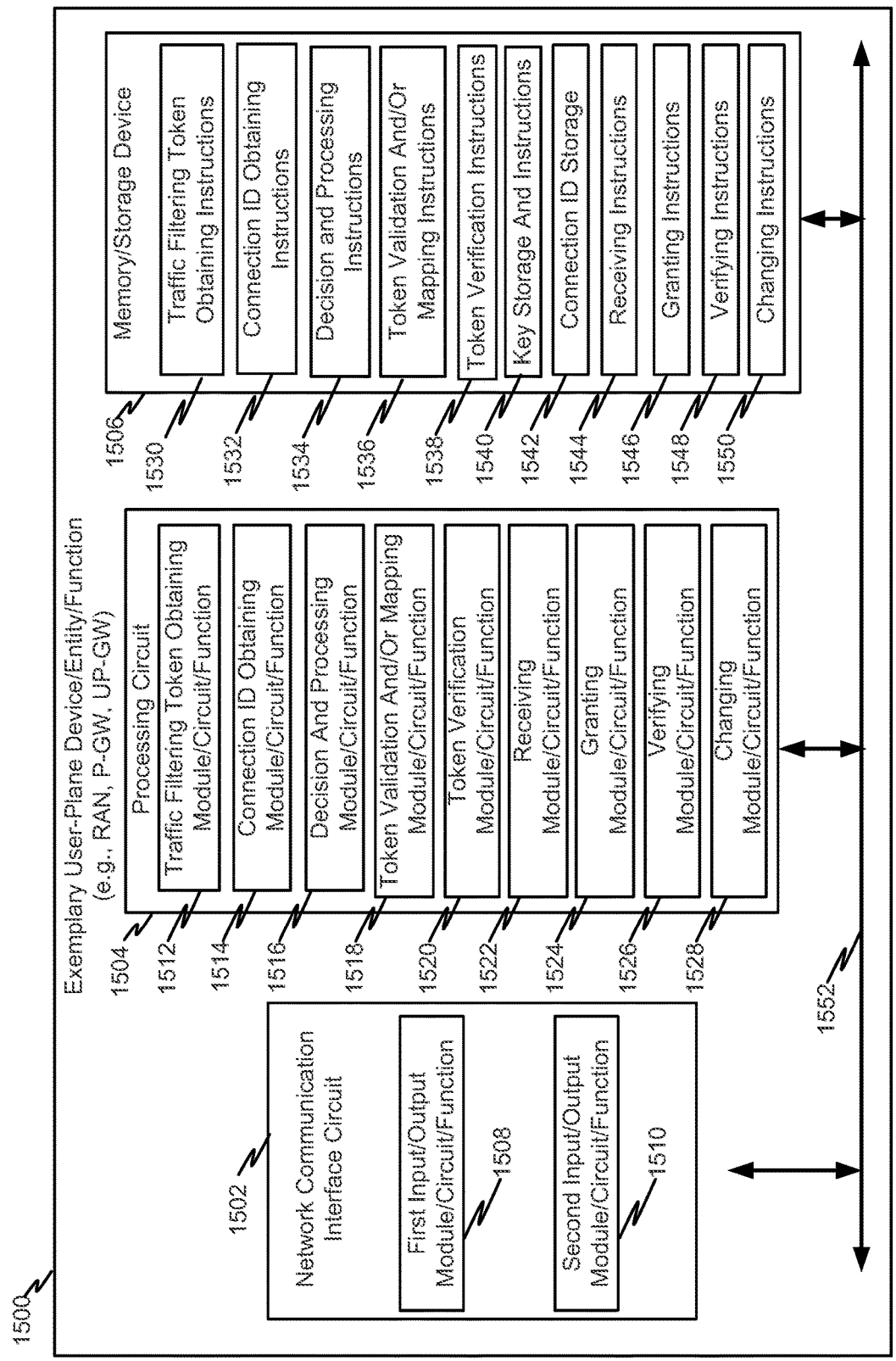
FIG. 15 is a block diagram illustrating an exemplary user-plane device/entity/function configured to support use of traffic filtering tokens for in-flow packet prioritization and data-dependent flexible QoS policy in accordance with aspects described herein.

FIG. 15 is a block diagram illustrating an exemplary user-plane device/entity/function 1500 configured to support use of traffic filtering tokens and/or packet-set marking (e.g., an identification value) for in-flow packet prioritization and data-dependent flexible QoS policy in accordance with aspects described herein. The exemplary user-plane device/entity/function 1500 may be a network device/entity/function that determines a quality of service (QoS) treatment of packets in a packet flow. In accordance with one aspect, the exemplary user-plane device/entity/function 1500 may be representative of a RAN (e.g., an access node of a RAN, an eNodeB). In accordance with another aspect, the exemplary user-plane device/entity/function 1500 may be representative of a user-plane gateway (e.g., a UP-GW) or a PDN gateway (e.g., a P-GW). In one example, the exemplary user-plane device/entity/function 1500 may include a network communication interface circuit 1502 adapted to communicate with a communication network, a processing circuit 1504 coupled to the network communication interface circuit 1502, and memory/storage device 1506 coupled to the processing circuit 1504 and network communication interface circuit 1502. These circuits and/or devices, or any combination of them, may perform actions of receiving, granting, verifying, changing, detecting, identifying, sending, creating, and/or mapping. Accordingly, these circuits and/or devices, or any combination of them, may be considered as non-limiting examples of means for receiving, means for granting, means for verifying, means for changing, means for detecting, means for identifying, means for sending, means for creating, and/or means for mapping.

The network communication interface circuit 1502, for example, may be adapted to communicate with a device, an application server (and/or an application function of the application server), a RAN, a gateway device (e.g., a UP-GW, a P-GW), and/or a control plane device/entity/function such as an MME, MMF, AMF, SMF, and/or a PCRF of a communication network. The network communication interface circuit 1502 may include a first input/output module/circuit/function 1508 for communication with a gateway device (e.g., UP-GW, P-GW) (and/or a RAN), and/or a control plane device/entity/function such as an MME, MMF, AMF, SMF, and/or a PCRF of a communication network and a second input/output module/circuit/function 1510 for communication with a device. In some implementations, the first input/output module/circuit/function 1508 and the second input/output module/circuit/function 1510 may be the same input/output module/circuit/function. The first input/output module/circuit/function 1508 may handle multiple packet flows established on multiple bearers or packet flows. The second input/output module/circuit/function 1510 may handle multiple packet flows established on multiple bearers or packet flows. The same or other input/output modules/circuits/functions may interface with other aspects of a core network, such as one or more PCRFs as known to those of skill in the art.

The processing circuit 1504 may include or implement one or more processors, application specific processors, hardware and/or software modules, etc., that may be configured to support access to wireless and wired networks and implement methods and instructions related, for example, to use of traffic filtering tokens and/or packet-set marking for in-flow packet prioritization and data-dependent flexible QoS policy. In some aspects, the processing circuit 1504 may include a traffic filtering token obtaining module/circuit/function 1512, a connection ID obtaining module/circuit/function 1514, a decision and processing module/circuit/function 1516, a token validation and/or mapping module/circuit/function 1518, a token verification module/circuit/function 1520, a receiving module/circuit/function 1522 configured, for example, to receive a request to change a QoS treatment of packets in the packet flow that are marked with an identification value, a granting module/circuit/function 1524 configured, for example, to grant the request and thereby trigger a different QoS treatment of packets in a first set of packets of the packet flow marked with the identification value, a verifying module/circuit/function 1526 configured, for example, to verify that the user device is authorized to send the request to change the QoS treatment of packets in the packet flow, and a changing module/circuit/function 1528 configured, for example, to change the QoS treatment for the first set of packets in the packet flow marked with the identification value according to the request.

The memory/storage device 1506 may be adapted to include traffic filtering token obtaining instructions 1530, Connection ID obtaining instructions 1532, decision and processing instructions 1534, token validation and/or mapping instructions 1536, token verification instructions 1538, key (e.g., shared and/or unshared secret key) storage and instructions 1540, Connection ID storage 1542, receiving instructions 1544, granting instructions 1546, verifying instructions 1548, and changing instructions 1550. This list is non-limiting.

Communication between the network communication interface circuit 1502, processing circuit 1504, memory/storage device 1506, and other components (not shown) of exemplary user-plane device/entity/function 1500 may be through a communication bus 1552 and/or one or more additional interface busses (not shown) as known to those of skill in the art.

Exemplary Methods Operational at a User-Plane Device/Entity/Function

Figure 16:
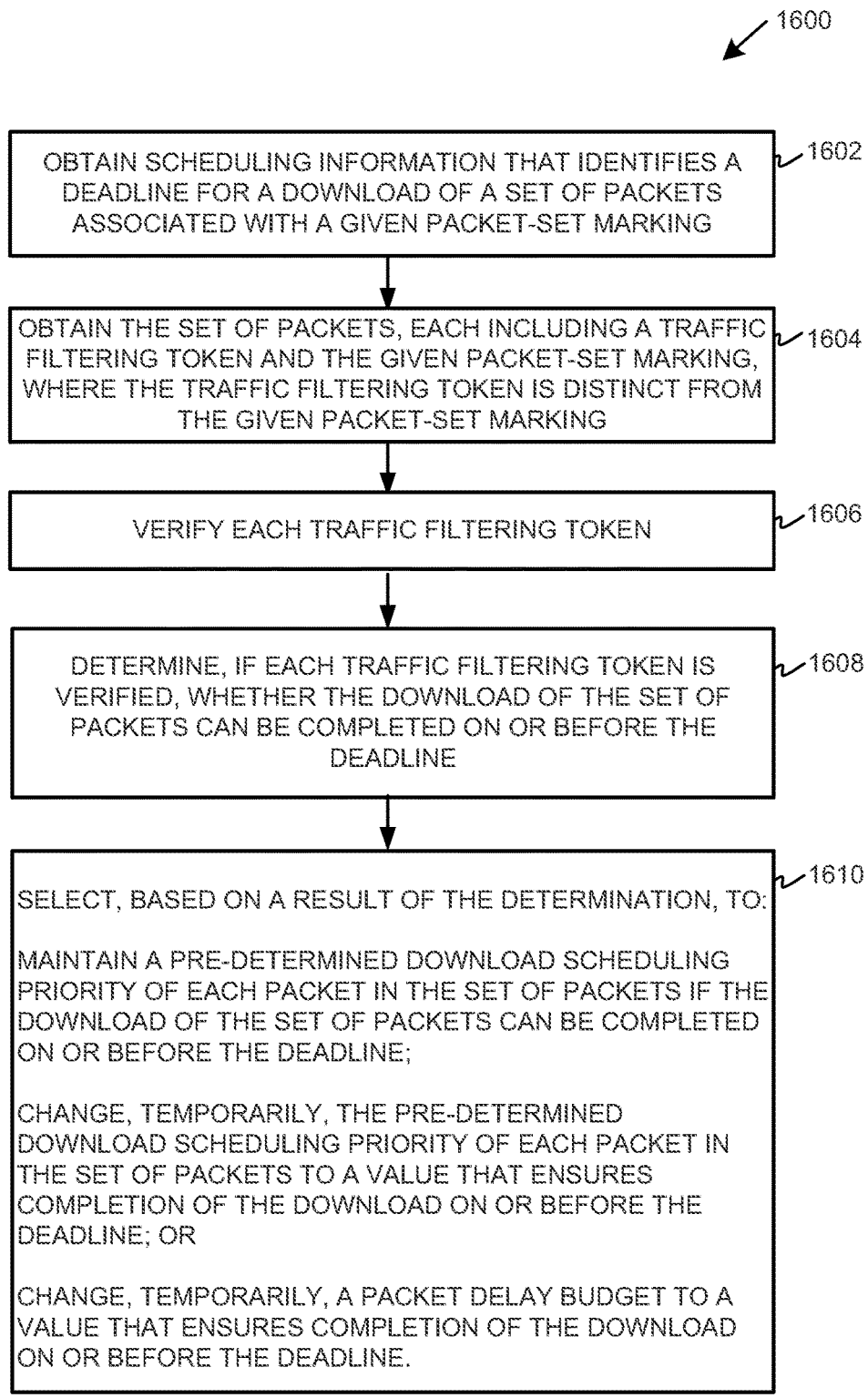
FIG. 16 is a flowchart of a first exemplary method operational at a user-plane entity in accordance with aspects described herein.

FIG. 16 is a flowchart of a first exemplary method 1600 operational at a user-plane entity in accordance with aspects described herein. The exemplary method 1600 may include obtaining scheduling information that identifies a deadline for the delivery to the device over the access link of a set of packets associated with a given packet-set marking 1602 in accordance with aspects described herein. The exemplary method 1600 may further include obtaining the set of packets, each including a traffic filtering token and the given packet-set marking, where the traffic filtering token is distinct from the given packet-set marking 1604. The exemplary method 1600 may further include verifying each traffic filtering token 1606. The exemplary method 1600 may still further include determining, if each traffic filtering token is verified, whether the download of the set of packets can be completed on or before the deadline 1608. And, the method may further include selecting, based on a result of the determination, to maintain a pre-determined download scheduling priority of each packet in the set of packets if the download of the set of packets can be completed on or before the deadline; change, temporarily, the pre-determined download scheduling priority of each packet in the set of packets to a value that ensures completion of the download on or before the deadline; or change, temporarily, a packet delay budget to a value that ensures completion of the download on or before the deadline 1610.

According to an aspect, the method further includes mapping each packet in the set of packets to the device using data obtained from the traffic filtering token; removing the traffic filtering token and packet-set marking from each packet; and sending each packet to the device according to the mapping.

Figure 17:
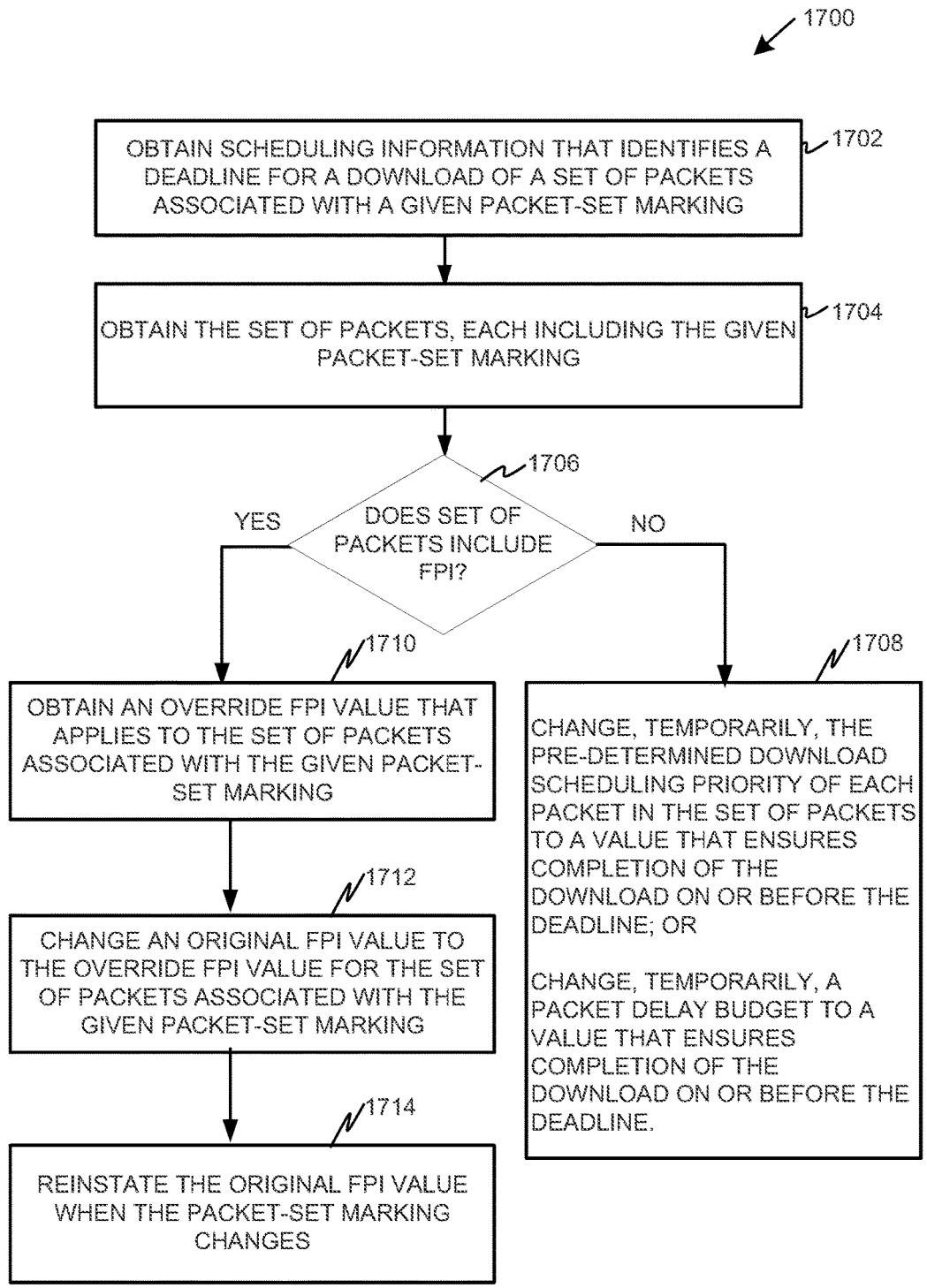
FIG. 17 is a flowchart of a second exemplary method operational at a user-plane entity in accordance with aspects described herein.

FIG. 17 is a flowchart of a second exemplary method 1700 which may be operational at a RAN or a user-plane entity in accordance with aspects described herein. It is possible that in 5G networks, the second exemplary method 1700 may be executed in a user plane function (UPF) device/entity/function. In a 5G network, the UPF may perform the same functions as the RAN for modifying the QoS treatment of packets based on a request from the device; however the UPF may not change the scheduling priority over the radio, but instead may change the QoS packet marking to match the modified QoS treatment when forwarding the packets to the RAN (which causes the RAN to modify the scheduling priority). The exemplary method may include obtaining scheduling information that identifies a deadline for a download of a set of packets associated with a given packet-set marking 1702. The method further includes obtaining the set of packets, each including the given packet-set marking 1704. Determining if the set of packets includes flow priority indication (FPI) values 1706. If the set of packets does not include FPI values, for each packet associated with the given packet-set marking, the method may further include changing, temporarily, a pre-determined download scheduling priority of each packet in the set of packets to a value that ensures completion of the download on or before the deadline, or changing, temporarily, a packet delay budget to a value that ensures completion of the download on or before the deadline 1708. If the set of packets does include FPI values, the method may further include obtaining an override FPI value that applies to the set of packets associated with the given packet-set marking 1710. The method may still further include changing an original flow priority indication (FPI) value, assigned by a gateway device at packet flow establishment, to the override FPI value for the set of packets associated with the given packet-set marking 1712. The method may still further include reinstating the original FPI value when the packet-set marking changes.

According to an aspect, the method further includes mapping each packet in the set of packets to the device using data obtained from a traffic filtering token; removing the traffic filtering token and packet-set marking from each packet; and sending each packet to the device according to the mapping.

Figure 18:
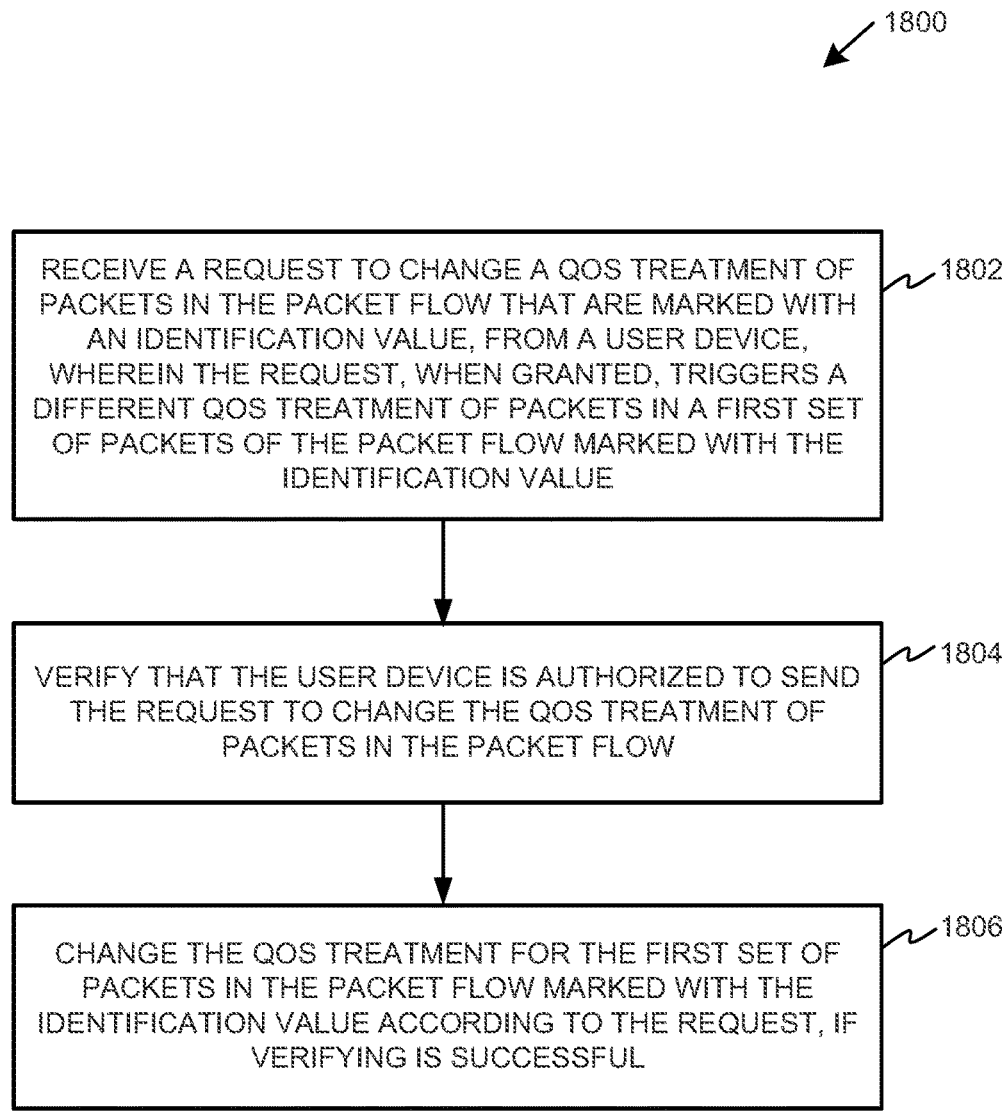
FIG. 18 is a flowchart of a third exemplary method operational at a user-plane entity in accordance with aspects described herein.

FIG. 18 is a flowchart of a third exemplary method 1800 operational at a user-plane entity (e.g., a network device that determines a quality of service (QoS) treatment of packets in a packet flow) in accordance with aspects described herein. The exemplary method may include receiving a request to change a QoS treatment of packets in the packet flow that are marked with an identification value, from a user device, wherein the request, when granted, triggers a different QoS treatment of packets in a first set of packets of the packet flow marked with the identification value 1802. The method may further include verifying that the user device is authorized to send the request to change the QoS treatment of packets in the packet flow, wherein a changed QoS treatment overrides an original QoS treatment established for the first set of packets marked with the identification value, responsive to receiving the request 1804. The method may still further include changing the QoS treatment for the first set of packets in the packet flow marked with the identification value according to the request, if verifying is successful 1806.

According to some aspects, the network entity that determines the QoS treatment of packets is at least one of a user-plane gateway or a radio access network.

According to some aspects, the identification value may be a marking that enables the network entity that determines the QoS treatment of packets to differentiate the first set of packets from a second set of packets in a packet flow to the user device.

According to some aspects, the identification value may be at least one of a token or a packet-set marking.

According to some aspects, the identification value may be a marking that is different and separate from a token used to identify a type of packet in the first set of packets.

According to some aspects, the identification value may be a marking that is different and separate from a marking used to identify a QoS treatment of a packet in the first set of packets.

According to some aspects, the method may further comprise: reestablishing the original QoS treatment at a conclusion of a predefined period or when the identification value of received packets belonging to the packet flow changes. According to some aspects, the changed QoS treatment may be a modified scheduling priority.

According to some aspects, the request, when granted, may occur in an absence of QoS renegotiation between the user device and a core network entity.

According to some aspects, the method may further comprise: receiving, with the request, scheduling related information including at least one of: a deadline for delivery of the first set of packets, a size of the first set of packets to be received by the deadline, a modified scheduling priority that overrides an original scheduling priority of the first set of packets, a modified flow priority indication (FPI) value that overrides a current FPI value of the first set of packets, or a modified packet delay budget (PDB) value that overrides a current PDB value of the first set of packets.

According to some aspects, the method may further comprise: receiving, with the request, a deadline, for delivery of the first set of packets, defined by the user device; and determining, using the deadline defined by the user device, whether the first set of packets can be received by the user device by the deadline if an original scheduling priority is maintained for the first set of packets; and maintaining the original scheduling priority of the first set of packets if the first set of packets can be received by the user device on or before the deadline defined by the user device, or changing the original scheduling priority of the first set of packets to a modified scheduling priority that ensures that the first set of packets can be received by the user device on or before the deadline defined by the user device. The method may further comprise sending, to the user device, the first set of packets marked with the identification value according to the original scheduling priority or the modified scheduling priority based on the determination; and sending, to the user device, after sending the first set of packets marked with the identification value, a subsequent set of packets according to the original scheduling priority.

Exemplary Device

Figure 19:
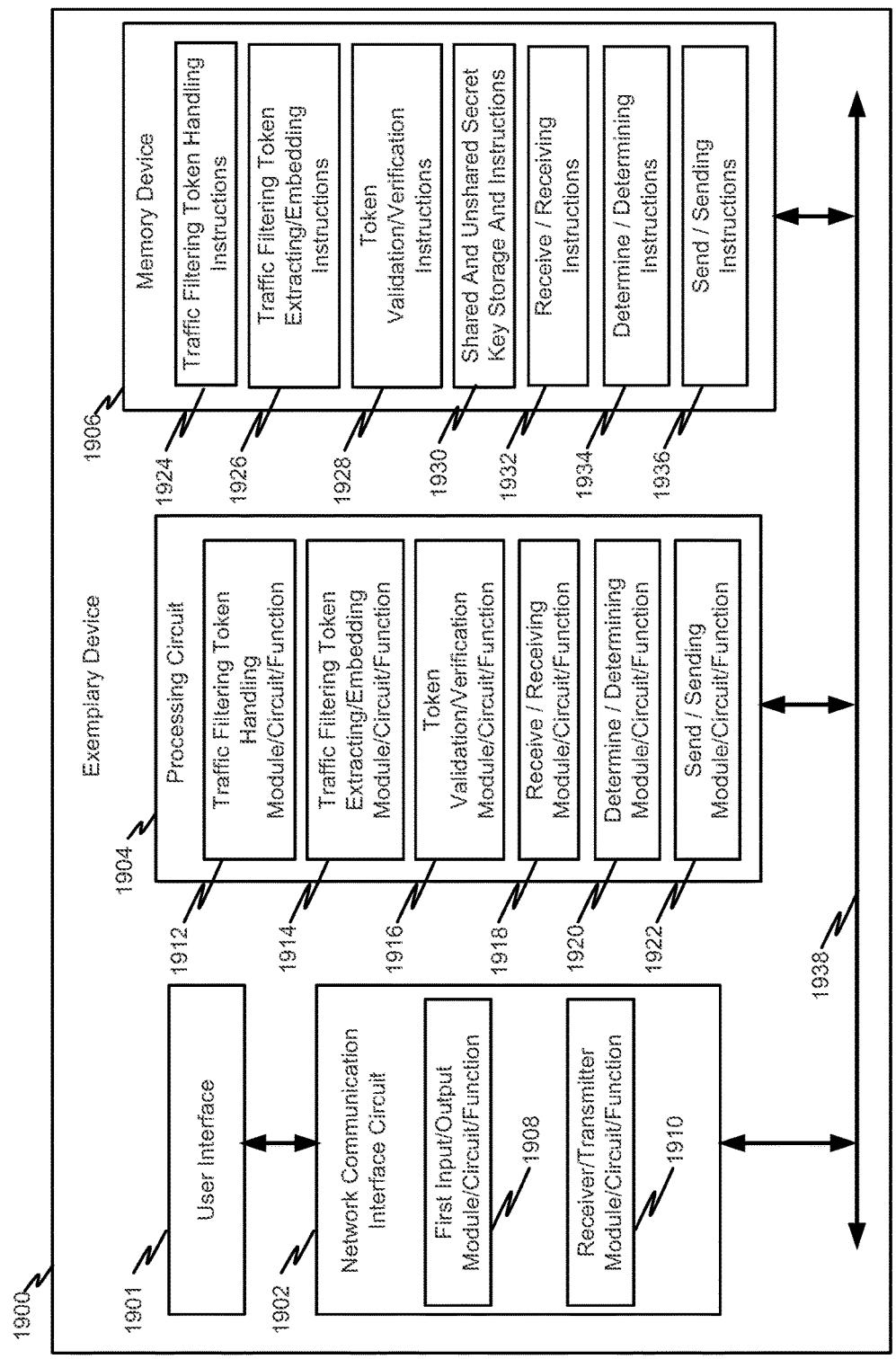
FIG. 19 is a block diagram illustrating an exemplary device configured to support use of traffic filtering tokens for in-flow packet prioritization and data-dependent flexible QoS policy in accordance with aspects described herein.

FIG. 19 is a block diagram illustrating an exemplary device 1900 configured to support use of traffic filtering tokens and/or packet-set marking (e.g., an identification value) for in-flow packet prioritization and data-dependent flexible QoS policy in accordance with aspects described herein. In one example, the device 1900 may include a network communication interface circuit 1902 adapted to communicate with a communication network such as a wireless network, a processing circuit 1904 coupled to the network communication interface circuit 1902, and a memory device 1906 coupled to the processing circuit 1904 and the network communication interface circuit 1902. These circuits and/or devices, or any combination of them, may perform actions of receiving, determining, detecting, identifying, sending, creating, and/or mapping. Accordingly, these circuits and/or devices, or any combination of them, may be considered as non-limiting examples of means for receiving, means for determining, means for detecting, means for identifying, means for sending, means for creating, and/or means for mapping.

The network communication interface circuit 1902 for communicating over the wireless network may include a first input/output module/circuit/function 1908 for input/output operations with a user interface 1901 of the device 1900. The network communication interface circuit 1902 may include a receiver/transmitter module/circuit/function 1910 for wireless communication with a RAN (e.g., an access node, an eNodeB).

The processing circuit 1904 may include or implement one or more processors, application specific processors, hardware and/or software modules, etc., that may be configured to support access to wireless and wired networks and implement methods and instructions related, for example, to use of traffic filtering tokens and/or packet-set marking for in-flow packet prioritization and data-dependent flexible QoS policy. For example, a token handling module/circuit/function 1912 may be configured to handle traffic filtering tokens and information related to such tokens. The traffic filtering tokens and information related to such tokens may be stored in the memory device 1906. By way of another example, a token extracting/embedding module/circuit function 1914 may be configured to extract tokens from downlink packets from a RAN and/or embed (include) tokens in packets forwarded to the RAN. By way of still another example, a token validation/verification module/circuit/function 1916 may be configured to validate/verify tokens received, for example, from the RAN. By way of still another example, a receive or receiving module/circuit function 1918 may be configured to receive at least one packet belonging to a first set of packets of a packet flow marked with an identification value. A determine or determining module/circuit function 1920 may be configured to determine that the at least one packet is marked with the identification value, and may be further configured to determine to change a quality of service (QoS) treatment of packets belonging to the first set of packets marked with the identification value that are yet to be received. By way of still another example, a send or sending module/circuit function 1922 may be configured to send a request to change the QoS treatment of packets belonging to the first set of packets marked with the identification value that are yet to be received to trigger a different QoS treatment of packets within the packet flow, responsive to determining to change the QoS treatment.

The memory device 1906 may be configured to include token handling instructions 1924, token extracting/embedding instructions 1926, token validation/verification instructions 1928, shared and unshared secret key storage and instructions 1930, receive/receiving instructions 1932, determine/determining instructions 1934, and send/sending instructions 1936.

Communication between the network communication interface circuit 1902, processing circuit 1904, memory device 1906, and other components (not shown) of device 1900 may be through a communication bus 1938 and/or one or more additional interface busses (not shown) as known to those of skill in the art.

Exemplary Method Operational at a Device

Figure 20:
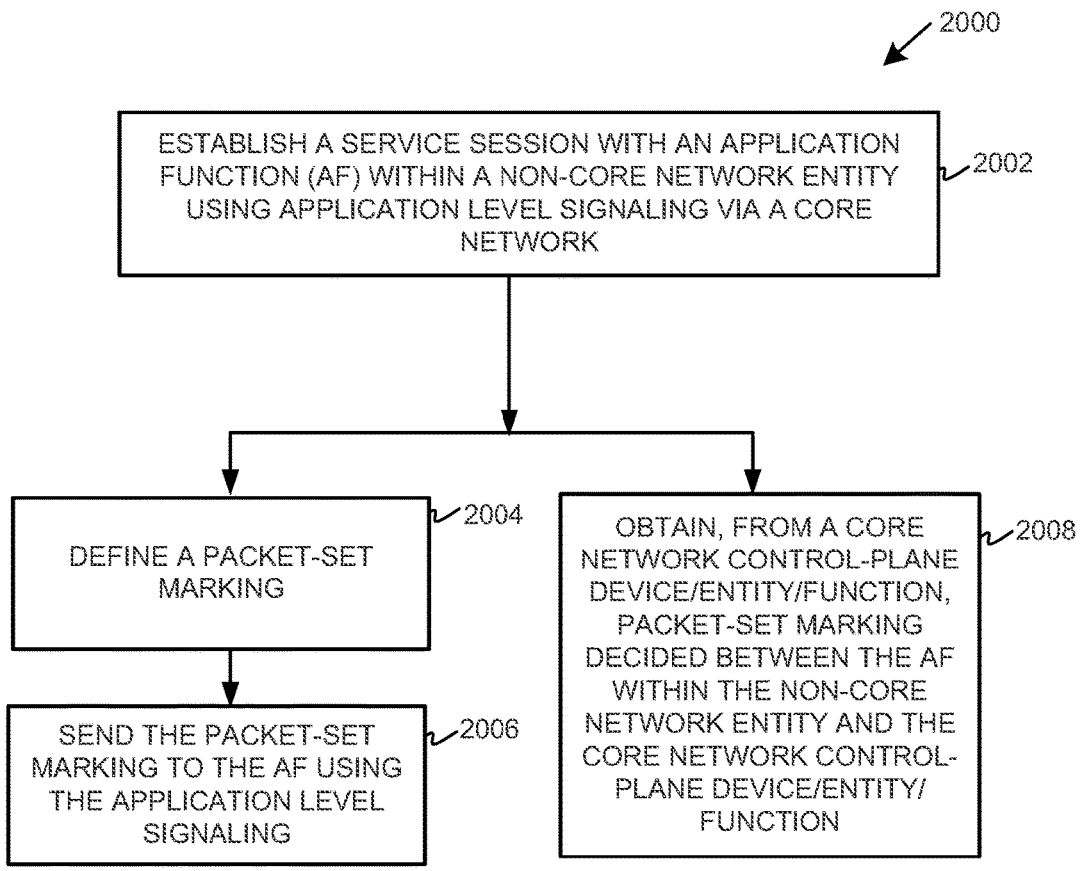
FIG. 20 is a flowchart of an exemplary method operational at a device in accordance with aspects described herein.

FIG. 20 is a flowchart of an exemplary method 2000 operational at a device in accordance with aspects described herein. The exemplary method 2000 may include establishing a service session with an application function (AF) of an application server using application level signaling via a network; and either A) defining a packet-set marking 2004, and sending the packet-set marking to the AF of the application server using the application level signaling 2006; or B) obtaining, from a control-plane device/entity/function of the core network, packet-set marking decided between the AF of the application server and the core network control-plane device/entity/function 2008.

According to an aspect, the method further includes providing scheduling related information to a RAN to temporarily override current scheduling information at the RAN.

According to another aspect, the method further includes providing scheduling related information to a RAN; and providing information to the RAN on how to identify which packets the scheduling-related information applies to.

Figure 21:
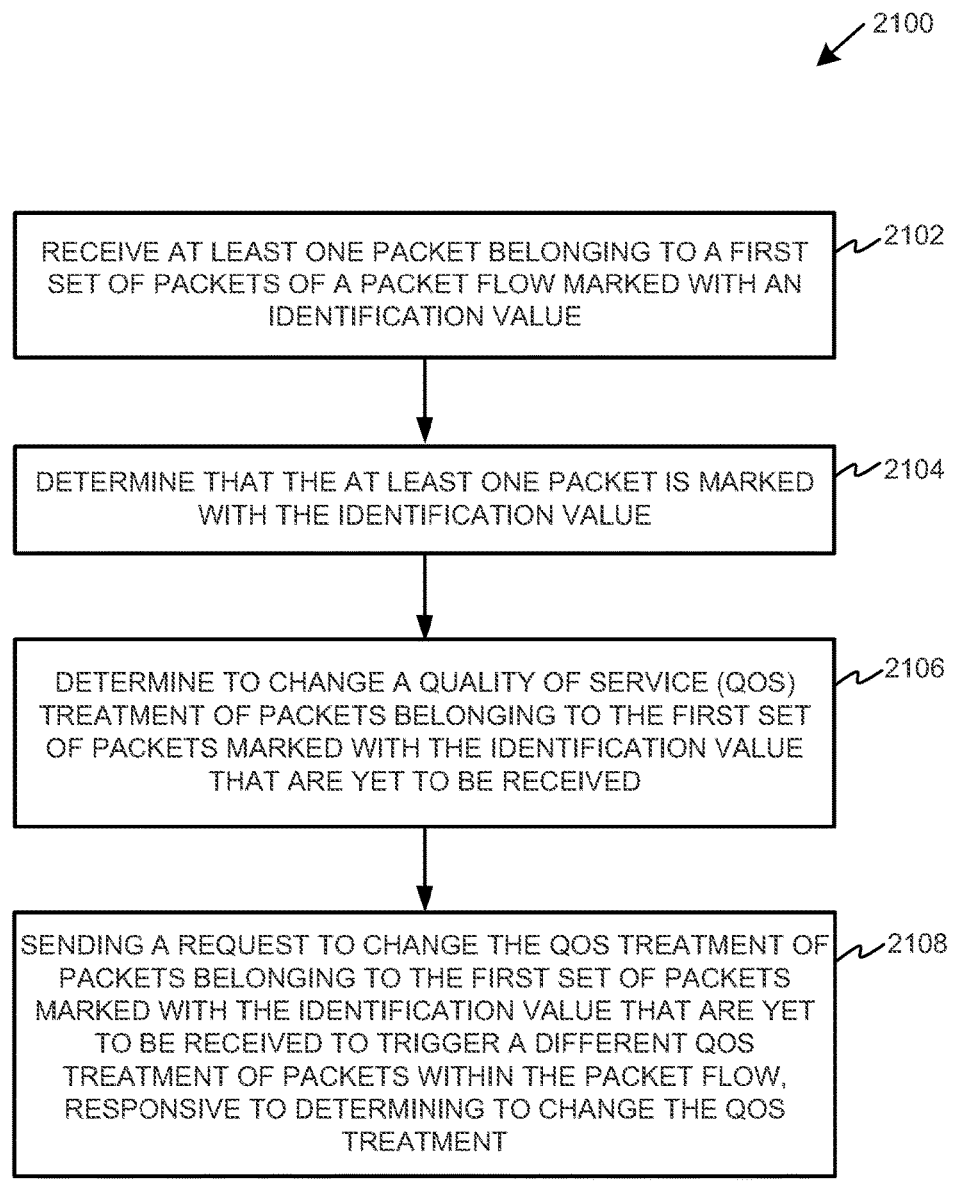
FIG. 21 is a flowchart of an exemplary method operational at a device in accordance with aspects described herein.

FIG. 21 is a flowchart of an exemplary method 2100 operational at a device in accordance with aspects described herein. The exemplary method 2100 may include receiving at least one packet belonging to a first set of packets of a packet flow marked with an identification value 2102. The method may further include determining that the at least one packet is marked with the identification value 2104. The method may further include determining to change a quality of service (QoS) treatment of packets belonging to the first set of packets marked with the identification value that are yet to be received 2106. The method may still further include sending a request to change the QoS treatment of packets belonging to the first set of packets marked with the identification value that are yet to be received to trigger a different QoS treatment of packets within the packet flow, responsive to determining to change the quality of service (QoS) treatment 2108.

According to some aspects, the identification value may be a marking that enables at least one of a user-plane gateway or a radio access network to differentiate the first set of packets from a second set of packets in the packet flow.

According to some aspects, the identification value may be at least one of a token or a packet-set marking.

According to some aspects, the identification value may be a marking that is different and separate from a token used to identify a type of packet in the first set of packets.

According to some aspects, the identification value may be a marking that is different and separate from a marking used to identify a QoS treatment of a packet in the first set of packets.

According to some aspects, the identification value may be based on a pre-negotiation with a source of the packets in the packet flow that marked the first set of packets with the identification value.

According to some aspects, the change to the QoS treatment may be a modification of a scheduling priority.

According to some aspects, determining to change may further comprise: determining whether a number of received packets is at least one of: less than a first predetermined threshold at a time of determining, or projected to be less than a second predetermined threshold at an end of a deadline.

According to some aspects, sending the request further comprises: sending scheduling-related information to a radio access network so that a modified scheduling priority can be used by the radio access network for the packets marked with the identification value that are yet to be received.

According to some aspects, sending the request further comprises: sending scheduling-related information and the identification value to permit a radio access network to identify which packets in the packet flow the scheduling-related information applies to.

According to some aspects, sending the request further comprises at least one of: sending scheduling information to a radio access network when the first set of packets marked with the identification value starts, and sending the identification value to identify packets in the first set of packets; or sending an indication of a change of scheduling priority for the first set of packets marked with the identification value when a deadline related to the first set of packets is approaching.

According to some aspects, sending the request further comprises: sending information to identify the first set of packets in the packet flow that is marked with the identification value to a radio access network and sending at least one of: a deadline related to the first set of packets; or a new value of a Packet Delay Budget (PDB) that overrides a current PDB for the packet flow, and that applies only to packets to be received in the packet flow that are marked with the identification value.

According to some aspects, the current PDB is a PDB established at packet flow setup and the current PDB is reinstated after a change to the identification value.

According to some aspects, sending further comprises: sending information to identify the first set of packets marked with an identification value; and sending an override Flow Priority Indication (FPI) value associated with the first set of packets to override FPI marking performed by a gateway.

According to some aspects, sending further comprises: sending a deadline associated with the first set of packets marked with an identification value.

Figure 22:
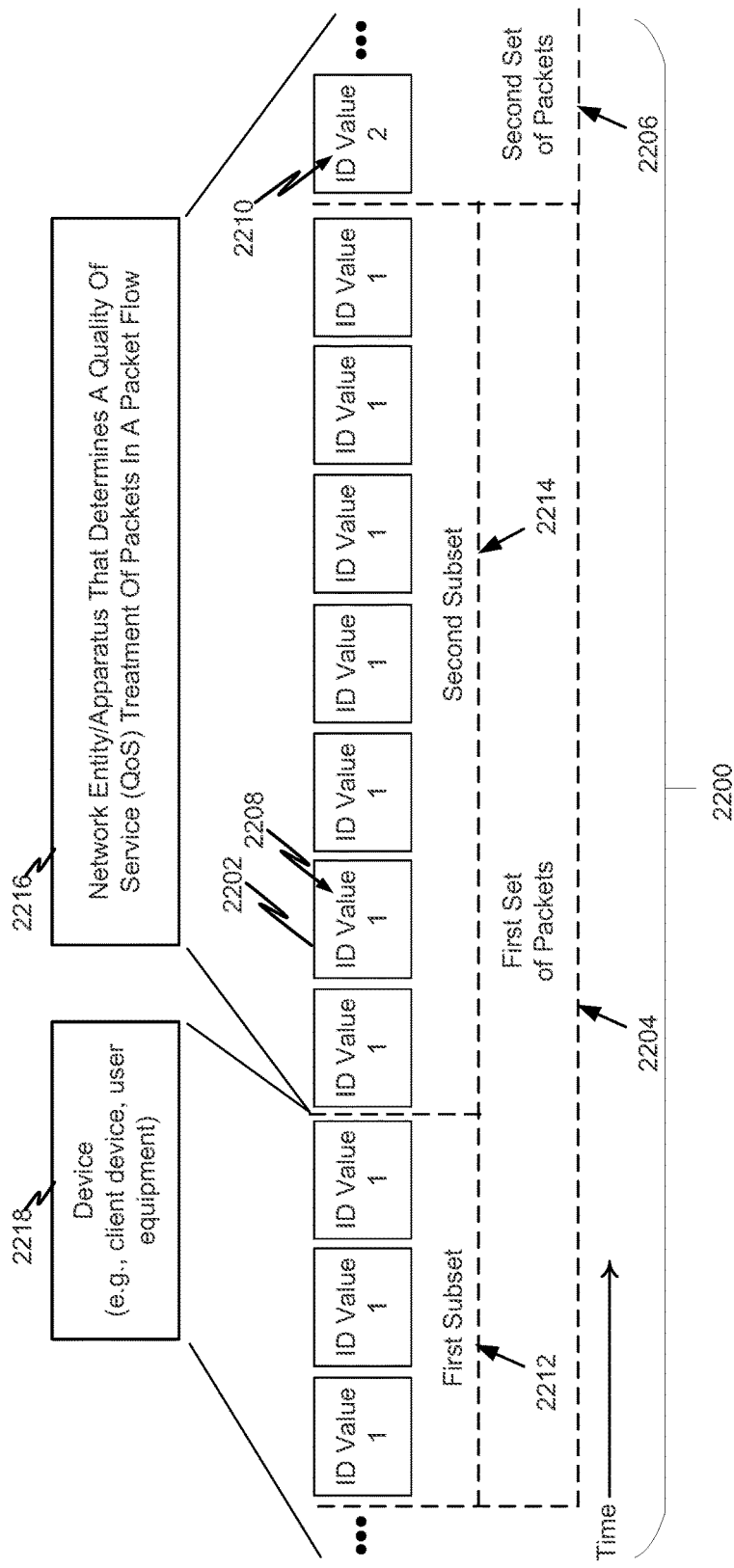
FIG. 22 is a model of a packet flow and its relationship in time to its location in a device and a network entity/apparatus in accordance with aspects described herein.

FIG. 22 is a model of a packet flow 2200 and its relationship in time to its location in a device 2218 and a network entity/apparatus 2216 in accordance with aspects described herein. FIG. 22 shows a packet flow 2200 that includes packets 2202 in a first set 2204 of packets and packets 2202 in a second set 2206 of packets. Each packet in the first set 2204 of packets is marked with a first identification value 2208 (e.g., ID Value 1). Each packet in the second set 2206 of packets is marked with a second identification value 2210 (e.g., ID Value 2), which may be different from the first identification value. The first identification value 2208 and second identification value 2210 may each be a simple binary value (e.g., 1 or 0) or may be a more complex value. Multiple packets 2202 may be marked with the same identification value. For example, the packets in the first set 2204 of packets are all marked with a first identification value 2208 (e.g., ID Value 1). The packets in the second set 2206 of packets are all marked with a second identification value 2210 (e.g., ID Value 2). The identification value may be a marking that enables a network entity/apparatus 2216 that determines a quality of service (QoS) treatment of packets in the packet flow 2200 to differentiate the first set 2204 of packets from the second set 2206 of packets in the packet flow 2200. The network entity/apparatus 2216 that determines the quality of service (QoS) treatment of packets in the packet flow may be at least one of a user-plane gateway or a radio access network (or an apparatus thereof).

The first identification value 2208 and second identification value 2210 (e.g., ID Value 1, ID Value 2) may each be at least one of a token or a packet-set marking. The first identification value 2208 and second identification value 2210 (e.g., ID Value 1, ID Value 2) may each be a marking that is different and separate from a token used to identify a type of packet in the first set 2204 of packets and/or the second set 2206 of packets. The first identification value 2208 and second identification value 2210 (e.g., ID Value 1, ID Value 2) may each be a marking that is different and separate from a marking used to identify a QoS treatment of a packet in the first set 2204 of packets and/or the second set 2206 of packets. The first identification value 2208 (e.g., ID Value 1) may be based on a pre-negotiation with a source (not shown) of the packets 2202 in the packet flow 2200 that marked the first set 2204 of packets with the first identification value 2208 (e.g., the first identification value 2208 of "ID Value 1"). The second identification value 2210 (e.g., ID Value 2) may be based on a pre-negotiation with a source (not shown) of the packets 2202 in the packet flow 2200 that marked the second set 2206 of packets with the second identification value 2210 (e.g., the second identification value 2210 of "ID Value 2").

As depicted in FIG. 22, at a given time, a first number (e.g., 1 or more) of the first set 2204 of packets may be received at a device 2218 (e.g., a chip component, a client device, a mobile device, a user equipment, a user device, a terminal) while other packets of the same first set 2204 of packets are yet to be received at the device 2218. Accordingly, as shown in FIG. 22, the first set 2204 of packets may be conceptually divided into a first subset 2212 and a second subset 2214. The first subset 2212 and the second subset 2214 of the first set 2204 of packets maintain their first identification value 2208 marking of ID Value 1.

As depicted in FIG. 22, at a given time, the first subset 2212 of packets may be received at the device 2218, while the second subset 2214 of packets are still at the network entity/apparatus 2216 (or may even not yet be delivered to the network entity/apparatus 2216). Accordingly, the second subset 2214 of packets are "yet to be received" by the device 2218. Meanwhile, after receiving at least one packet in the first subset 2212 belonging to the first set 2204 of packets of a packet flow 2200 marked with a first identification value 2208 (e.g., ID Value 1), the device may determine that the at least one packet is marked with the first identification value 2208. The device 2218 may then determine to change a quality of service (QoS) treatment of packets belonging to the first set 2204 of packets marked with the first identification value 2208 (e.g., ID Value 1) that are yet to be received. The device 2218 may then send a request, to the network entity/apparatus 2216, to change the QoS treatment of packets belonging to the first set 2204 of packets marked with the first identification value 2208 (e.g., ID Value 1) that are yet to be received to trigger a different QoS treatment of packets 2202 within the packet flow 2200, responsive to determining to change the QoS treatment.

Specific implementations shown and described are only examples and should not be construed as the only way to implement the present disclosure unless specified otherwise herein.

One or more of the components, acts, features and/or functions described herein and illustrated in the drawings may be rearranged and/or combined into a single component, act, feature, or function or embodied in several components, acts, features, or functions. Additional elements, components, acts, and/or functions may also be added without departing from the invention. The algorithms described herein may also be efficiently implemented in software. The algorithms described herein may also be efficiently implemented, included, and/or embedded in hardware.

In the description, elements, modules, circuits, and/or functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. For the most part, details concerning timing considerations and the like have been omitted where such details are not necessary to obtain a complete understanding of the present disclosure and are within the abilities of persons of ordinary skill in the relevant art.

Also, it is noted that the aspects may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals, including a single data signal.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Moreover, a storage medium may represent one or more devices for storing data, including read-only memory (ROM), random access memory (RAM), magnetic disk storage mediums, optical storage mediums, flash memory devices, and/or other machine-readable mediums, processor-readable mediums, and/or computer-readable mediums for storing information. The terms "machine-readable medium," "computer-readable medium," and/or "processor-readable medium" may include, but are not limited to non-transitory mediums such as portable or fixed storage devices, optical storage devices, and various other mediums capable of storing, containing, or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines, and/or devices.

Furthermore, aspects may be implemented by hardware, software, firmware, middleware, microcode, or any combination thereof. When implemented in software, firmware, middleware, or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, elements, modules, circuits, functions, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, and/or any other such configuration. A general-purpose processor, configured for executing aspects described herein, is considered a special purpose processor for carrying out such aspects. Similarly, a general-purpose computer is considered a special purpose computer when configured for carrying out aspects described herein.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, elements, modules, circuits, functions, and/or algorithm steps described in connection with the aspects disclosed herein may be implemented as electronic hardware, computer software, or combinations of both. To clearly illustrate this interchangeability of hardware and software, various illustrative components, blocks, elements, modules, circuits, functions, and/or steps have been described above generally in terms of their functionality. Whether such functionality is implemented as hardware, software, or a combination thereof depends upon the particular application and design selections imposed on the overall system or network.

The various features of the invention described herein can be implemented in different systems or networks without departing from the invention. It should be noted that the foregoing aspects are merely examples and are not to be construed as limiting the invention. The description of the aspects is intended to be illustrative, and not to limit the scope of the claims. As such, the present teachings can be readily applied to other types of apparatuses and many alternatives, modifications, and variations will be apparent to those skilled in the art.

What is claimed is:

1. A method, operational at a device, comprising:
receiving at least one packet belonging to a first set of packets of a packet flow marked with an identification value;
determining that the at least one packet is marked with the identification value;
determining to change a quality of service (QoS) treatment of packets belonging to the first set of packets marked with the identification value that are yet to be received; and
sending a request to change the QoS treatment of packets belonging to the first set of packets marked with the identification value that are yet to be received to trigger a different QoS treatment of packets within the packet flow, responsive to determining to change the QoS treatment.

2. The method of claim 1, wherein the identification value is a marking that enables at least one of a user-plane gateway or a radio access network entity to differentiate the first set of packets from a second set of packets in the packet flow.

3. The method of claim 1, wherein the identification value is at least one of a token or a packet-set marking.

4. The method of claim 1, wherein the identification value is a marking that is different and separate from a token used to identify a type of packet in the first set of packets.

5. The method of claim 1, wherein the identification value is a marking that is different and separate from a marking used to identify a QoS treatment of a packet in the first set of packets.

6. The method of claim 1, wherein the identification value is based on a pre-negotiation with a source of the packets in the packet flow that marked the first set of packets with the identification value.

7. The method of claim 1, wherein the change to the QoS treatment is a modification of a scheduling priority.

8. The method of claim 1, wherein determining to change further comprises:
determining whether a number of received packets is at least one of:
less than a first predetermined threshold at a time of determining, or
projected to be less than a second predetermined threshold at an end of a deadline.

9. The method of claim 1, wherein sending the request further comprises:
sending scheduling-related information to a radio access network so that a modified scheduling priority can be used by the radio access network for the packets marked with the identification value that are yet to be received.

10. The method of claim 1, wherein sending the request further comprises:
sending scheduling-related information and the identification value to permit a radio access network to identify which packets in the packet flow the scheduling-related information applies to.

11. The method of claim 1, wherein sending the request further comprises at least one of:
- sending scheduling information to a radio access network when the first set of packets marked with the identification value starts, and sending the identification value to identify packets in the first set of packets; or
- sending an indication of a change of scheduling priority for the first set of packets marked with the identification value when a deadline related to the first set of packets is approaching.

12. The method of claim 1, wherein sending the request further comprises:
- sending information to identify the first set of packets in the packet flow that is marked with the identification value to a radio access network and sending at least one of:
  - a deadline related to the first set of packets; or
  - a new value of a Packet Delay Budget (PDB) that overrides a current PDB for the packet flow, and that applies only to packets to be received in the packet flow that are marked with the identification value.

13. The method of claim 12, wherein the current PDB is a PDB established at packet flow setup and the current PDB is reinstated after a change to the identification value.

14. The method of claim 1, wherein sending further comprises:
- sending information to identify the first set of packets marked with an identification value; and
- sending an override Flow Priority Indication (FPI) value associated with the first set of packets to override FPI marking performed by a gateway.

15. The method of claim 14, wherein sending further comprises:
- sending a deadline associated with the first set of packets marked with an identification value.

16. A device, comprising:
- a network communication interface circuit adapted to communicate with a communication network; and
- a processing circuit coupled to the network communication interface circuit, the processing circuit configured to:
  - receive at least one packet belonging to a first set of packets of a packet flow marked with an identification value;
  - determine that the at least one packet is marked with the identification value;
  - determine to change a quality of service (QoS) treatment of packets belonging to the first set of packets marked with the identification value that are yet to be received; and
  - send a request to change the QoS treatment of packets belonging to the first set of packets marked with the identification value that are yet to be received to trigger a different QoS treatment of packets within the packet flow, responsive to determining to change the QoS treatment.

17. The device of claim 16, wherein the identification value is a marking that enables at least one of a user-plane gateway or a radio access network entity to differentiate the first set of packets from a second set of packets in the packet flow.

18. The device of claim 16, wherein the identification value is at least one of a token or a packet-set marking.

19. The device of claim 16, wherein the identification value is a marking that is different and separate from a token used to identify a type of packet in the first set of packets.

20. The device of claim 16, wherein the identification value is a marking that is different and separate from a marking used to identify a QoS treatment of a packet in the first set of packets.

21. The device of claim 16, wherein the identification value is based on a pre-negotiation with a source of the packets in the packet flow that marked the first set of packets with the identification value.

22. The device of claim 16, wherein the change to the QoS treatment is a modification of a scheduling priority.

23. The device of claim 16, wherein to determine to change, the processing circuit is further configured to:
- determine whether a number of received packets is at least one of:
  - less than a first predetermined threshold at a time of determining, or
  - projected to be less than a second predetermined threshold at an end of a deadline.

24. The device of claim 16, wherein to send the request, the processing circuit is further configured to:
- send scheduling-related information to a radio access network so that a modified scheduling priority can be used by the radio access network for the packets marked with the identification value that are yet to be received.

25. The device of claim 16, wherein to send the request, the processing circuit is further configured to:
- send scheduling-related information and the identification value to permit a radio access network to identify which packets in the packet flow the scheduling-related information applies to.

26. The device of claim 16, wherein to send the request, the processing circuit is further configured to at least one of:
- send scheduling information to a radio access network when the first set of packets marked with the identification value starts, and sending the identification value to identify packets in the first set of packets; or
- send an indication of a change of scheduling priority for the first set of packets marked with the identification value when a deadline related to the first set of packets is approaching.

27. The device of claim 16, wherein to send the request, the processing circuit is further configured to:
- send information to identify the first set of packets in the packet flow that is marked with the identification value to a radio access network and send at least one of:
  - a deadline related to the first set of packets; or
  - a new value of a Packet Delay Budget (PDB) that overrides a current PDB for the packet flow, and that applies only to packets to be received in the packet flow that are marked with the identification value.

28. The device of claim 27, wherein the current PDB is a PDB established at packet flow setup and the current PDB is reinstated after a change to the identification value.

29. The device of claim 16, wherein to send the request, the processing circuit is further configured to:
- send information to identify the first set of packets marked with an identification value; and
- send an override Flow Priority Indication (FPI) value associated with the first set of packets to override FPI marking performed by a gateway.

30. The device of claim 29, wherein to send the request, the processing circuit is further configured to:
- send a deadline associated with the first set of packets marked with an identification value.

31. A method, operational at a network entity that determines a quality of service (QoS) treatment of packets in a packet flow, comprising:
  receiving a request to change a QoS treatment of packets in the packet flow that are marked with an identification value, from a user device, wherein the request, when granted, triggers a different QoS treatment of packets in a first set of packets of the packet flow marked with the identification value;
  verifying that the user device is authorized to send the request to change the QoS treatment of packets in the packet flow, wherein a changed QoS treatment overrides an original QoS treatment established for the first set of packets marked with the identification value, responsive to receiving the request; and
  changing the QoS treatment for the first set of packets in the packet flow marked with the identification value according to the request, if verifying is successful.

32. The method of claim 31 wherein the network entity that determines the QoS treatment of packets is at least one of a user-plane gateway or a radio access network.

33. The method of claim 31, wherein the identification value is a marking that enables the network entity that determines the QoS treatment of packets to differentiate the first set of packets from a second set of packets in a packet flow to the user device.

34. The method of claim 31, wherein the identification value is at least one of a token or a packet-set marking.

35. The method of claim 31, wherein the identification value is a marking that is different and separate from a token used to identify a type of packet in the first set of packets.

36. The method of claim 31, wherein the identification value is a marking that is different and separate from a marking used to identify a QoS treatment of a packet in the first set of packets.

37. The method of claim 31, further comprising:
  reestablishing the original QoS treatment at a conclusion of a predefined period or when the identification value of received packets belonging to the packet flow changes.

38. The method of claim 31, wherein the changed QoS treatment is a modified scheduling priority.

39. The method of claim 31, wherein the request, when granted, occurs in an absence of QoS renegotiation between the user device and a core network entity.

40. The method of claim 31, further comprising:
  receiving, with the request, scheduling related information including at least one of:
    a deadline for delivery of the first set of packets,
    a size of the first set of packets to be received by the deadline,
    a modified scheduling priority that overrides an original scheduling priority of the first set of packets,
    a modified flow priority indication (FPI) value that overrides a current FPI value of the first set of packets, or
    a modified packet delay budget (PDB) value that overrides a current PDB value of the first set of packets.

41. The method of claim 31, further comprising:
  receiving, with the request, a deadline, for delivery of the first set of packets, defined by the user device; and
  determining, using the deadline defined by the user device, whether the first set of packets can be received by the user device by the deadline if an original scheduling priority is maintained for the first set of packets, and
  maintaining the original scheduling priority of the first set of packets if the first set of packets can be received by the user device on or before the deadline defined by the user device, or
  changing the original scheduling priority of the first set of packets to a modified scheduling priority that ensures that the first set of packets can be received by the user device on or before the deadline defined by the user device.

42. The method of claim 41, further comprising:
  sending, to the user device, the first set of packets marked with the identification value according to the original scheduling priority or the modified scheduling priority based on the determination; and
  sending, to the user device, after sending the first set of packets marked with the identification value, a subsequent set of packets according to the original scheduling priority.

43. A network device that determines a quality of service (QoS) treatment of packets in a packet flow, comprising:
  a network communication interface circuit adapted to communicate with a communication network; and
  a processing circuit coupled to the network communication interface circuit, the processing circuit configured to:
    receive a request to change a QoS treatment of packets in the packet flow that are marked with an identification value, from a user device, wherein the request, when granted, triggers a different QoS treatment of packets in a first set of packets of the packet flow marked with the identification value;
    verify that the user device is authorized to send the request to change the QoS treatment of packets in the packet flow, wherein a changed QoS treatment overrides an original QoS treatment established for the first set of packets marked with the identification value, responsive to receiving the request; and
    change the QoS treatment for the first set of packets in the packet flow marked with the identification value according to the request, if verifying is successful.

44. The network device of claim 43, wherein the network device that determines the QoS treatment of packets is at least one of a user-plane gateway device or a radio access network device.

45. The network device of claim 43, wherein the identification value is a marking that enables the network device that determines the QoS treatment of packets to differentiate the first set of packets from a second set of packets in a packet flow to the user device.

46. The network device of claim 43, wherein the identification value is at least one of a token or a packet-set marking.

47. The network device of claim 43, wherein the identification value is a marking that is different and separate from a token used to identify a type of packet in the first set of packets.

48. The network device of claim 43, wherein the identification value is a marking that is different and separate from a marking used to identify a QoS treatment of a packet in the first set of packets.

49. The network device of claim 43, wherein the processing circuit is further configured to:
  reestablish the original QoS treatment at a conclusion of a predefined period or when the identification value of received packets belonging to the packet flow changes.

50. The network device of claim 43, wherein the changed QoS treatment is a modified scheduling priority.

51. The network device of claim 43, wherein the request, when granted, occurs in an absence of QoS renegotiation between the user device and a core network entity.

52. The network device of claim 43, wherein the processing circuit is further configured to:
  receive, with the request, scheduling related information including at least one of:
    a deadline for delivery of the first set of packets,
    a size of the first set of packets to be received by the deadline,
    a modified scheduling priority that overrides an original scheduling priority of the first set of packets,
    a modified flow priority indication (FPI) value that overrides a current FPI value of the first set of packets, or
    a modified packet delay budget (PDB) value that overrides a current PDB value of the first set of packets.

53. The network device of claim 43, wherein the processing circuit is further configured to:
  receive, with the request, a deadline, for delivery of the first set of packets, defined by the user device; and
  determine, using the deadline defined by the user device, whether the first set of packets can be received by the user device by the deadline if an original scheduling priority is maintained for the first set of packets, and
  maintain the original scheduling priority of the first set of packets if the first set of packets can be received by the user device on or before the deadline defined by the user device, or
  change the original scheduling priority of the first set of packets to a modified scheduling priority that ensures that the first set of packets can be received by the user device on or before the deadline defined by the user device.

54. The network device of claim 53, wherein the processing circuit is further configured to:
  send, to the user device, the first set of packets marked with the identification value according to the original scheduling priority or the modified scheduling priority based on the determining; and
  send, to the user device, after sending the first set of packets marked with the identification value, a subsequent set of packets according to the original scheduling priority.

* * * * *